US011463207B2

(12) United States Patent
Wang et al.

(10) Patent No.: US 11,463,207 B2
(45) Date of Patent: Oct. 4, 2022

(54) DATA TRANSMISSION METHOD, RECEIVE END DEVICE, AND NON-TRANSITORY COMPUTER-READABLE STORAGE MEDIUM

(71) Applicant: HUAWEI TECHNOLOGIES CO., LTD., Shenzhen (CN)

(72) Inventors: Xiaohan Wang, Shanghai (CN); Haicun Hang, Shanghai (CN); Ye Wu, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/810,716

(22) Filed: Mar. 5, 2020

(65) Prior Publication Data
US 2020/0204306 A1 Jun. 25, 2020

Related U.S. Application Data

(63) Continuation of application No. PCT/CN2018/103291, filed on Aug. 30, 2018.

(30) Foreign Application Priority Data

Sep. 8, 2017 (CN) .................. 2017108062723.4

(51) Int. Cl.
*H04L 1/18* (2006.01)
*H04L 5/00* (2006.01)
(Continued)

(52) U.S. Cl.
CPC ............ *H04L 1/189* (2013.01); *H04L 1/1819* (2013.01); *H04L 5/0051* (2013.01); *H04L 5/10* (2013.01); *H04W 72/042* (2013.01)

(58) Field of Classification Search
None
See application file for complete search history.

(56) References Cited

U.S. PATENT DOCUMENTS

2014/0029552 A1* 1/2014 Lv .................. H04L 1/1854
370/329
2014/0362801 A1 12/2014 Morita
(Continued)

FOREIGN PATENT DOCUMENTS

| CN | 101529785 A | 9/2009 |
| CN | 101562510 A | 10/2009 |

(Continued)

*Primary Examiner* — Edan Orgad
*Assistant Examiner* — Emmanuel K Maglo
(74) *Attorney, Agent, or Firm* — Hauptman Ham, LLP

(57) ABSTRACT

A data transmission method between a plurality of transmit end devices and a receive end device includes receiving at least one piece of transmission control information. The at least one piece of transmission control information includes transmission control information received by the receive end device from at least one of the plurality of transmit end devices, and transmission control information from each of the plurality of transmit end devices includes a retransmission process identifier. The transmission control information controls data transmission between transmit and receive end devices. The method also includes for each of the at least one piece of transmission control information, determining the transmit end device configured to send the piece of transmission control information, and performing a retransmission control operation on the data transmission received by the receive end device. The retransmission control operation includes the retransmission process identifier included in the piece of transmission control information.

3 Claims, 5 Drawing Sheets

(51) Int. Cl.
*H04L 5/10* (2006.01)
*H04W 72/04* (2009.01)

(56) References Cited

U.S. PATENT DOCUMENTS

| | | | |
|---|---|---|---|
| 2015/0110027 A1 | 4/2015 | Lim et al. | |
| 2016/0227541 A1* | 8/2016 | Damnjanovic | H04L 5/001 |
| 2016/0345206 A1* | 11/2016 | Yerramalli | H04L 5/001 |
| 2018/0042028 A1* | 2/2018 | Nam | H04B 7/0486 |
| 2018/0048372 A1* | 2/2018 | Sun | H04B 7/0632 |
| 2018/0270799 A1* | 9/2018 | Noh | H04L 27/2626 |

FOREIGN PATENT DOCUMENTS

| | | |
|---|---|---|
| CN | 102301821 A | 12/2011 |
| CN | 107005383 A | 8/2017 |
| EP | 3641187 A1 | 4/2020 |
| WO | 2008054313 A1 | 5/2008 |

* cited by examiner

A receive end device receives at least one piece of transmission control information, where the at least one piece of transmission control information includes transmission control information sent by at least one of a plurality of transmit end devices to the receive end device, and transmission control information sent by each of the at least one transmit end device to the receive end device includes a retransmission process identifier used in a retransmission control operation that is performed on data transmission from the transmit end device to the receive end device ⸺ 501

For each of the at least one piece of transmission control information, the receive end device determines a transmit end device that sends the piece of transmission control information ⸺ 502

The receive end device performs, based on a retransmission process identifier included in the piece of transmission control information, a retransmission control operation on the transmit end device that sends the piece of transmission control information ⸺ 503

FIG. 5

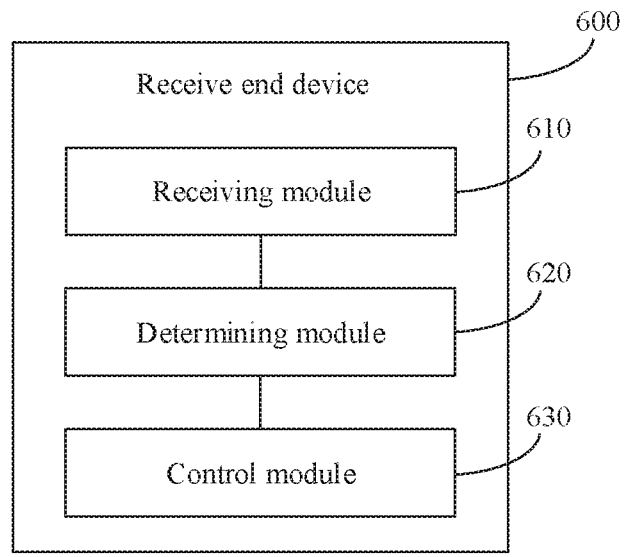

FIG. 6

DATA TRANSMISSION METHOD, RECEIVE END DEVICE, AND NON-TRANSITORY COMPUTER-READABLE STORAGE MEDIUM

CROSS-REFERENCE TO RELATED APPLICATIONS

This application is a continuation of International Application No. PCT/CN2018/103291, filed on Aug. 30, 2018, which claims priority to Chinese Patent Application No. 201710806272.4, filed on Sep. 8, 2017, the disclosures of which are hereby incorporated by reference in their entireties.

TECHNICAL FIELD

This application relates to the mobile communications field, and in particular, to a data transmission method, a mode indication method, a mode determining method, and an apparatus.

BACKGROUND

A long term evolution (LTE) or long term evolution-advanced (LTE-A) communications system includes a transmit end device and a receive end device. Control information (for example, downlink control information) and data can be transmitted between the transmit end device and the receive end device, and data can be transmitted between the transmit end device and the receive end device by using a transport block (TB). The receive end device usually processes a TB by using a hybrid automatic repeat request (HARQ) process (process), to perform a HARQ operation.

In the LTE/LTE-A communications system, the transmit end device may indicate a HARQ process to the receive end device by using downlink control information (DCI), and the receive end device may perform a HARQ operation by using the HARQ process indicated by the transmit end device. Specifically, each HARQ process has a unique HARQ process number (HARQ process number), and DCI includes a HARQ process number field. The transmit end device may encapsulate, into the HARQ process number field in the DCI, a HARQ process number of a HARQ process allocated to the receive end device, and send the DCI to the receive end device by using a physical downlink control channel (PDCCH). The receive end device receives the DCI to determine the HARQ process allocated by the transmit end device to the receive end device, and performs a HARQ operation by using the HARQ process.

In a non-coherent joint transmission (NCJT) scenario of a new radio (NR) communications system, a plurality of transmit end devices may simultaneously send data to a same receive end device, and in addition, each of the plurality of transmit end devices may independently send downlink control information to the receive end device, to indicate a HARQ process allocated by the transmit end device to the receive end device. However, currently, a retransmission scheme in the NCJT scenario has not been specifically designed in an NR standard.

SUMMARY

One or more embodiments of this application include a data transmission method, a mode indication method, a mode determining method, and an apparatus. A retransmission scheme in an NCJT scenario is designed in the solutions provided in some embodiments of this application. The technical solutions of this application are as follows:

According to at least one embodiment, a data transmission method is provided, where the method is applied to data transmission from a plurality of transmit end devices to a receive end device, transmission control information sent by each of the plurality of transmit end devices to the receive end device is used to control data transmission from the transmit end device to the receive end device, and the method includes:

receiving at least one piece of transmission control information, where the at least one piece of transmission control information includes transmission control information sent by at least one of the plurality of transmit end devices to the receive end device, and transmission control information sent by each of the at least one transmit end device to the receive end device includes a retransmission process identifier used in a retransmission control operation that is performed on the data transmission from the transmit end device to the receive end device;

for each of the at least one piece of transmission control information, determining a transmit end device that sends the piece of transmission control information; and performing, based on a retransmission process identifier included in the piece of transmission control information, a retransmission control operation on the transmit end device that sends the piece of transmission control information.

According to the data transmission method provided in some embodiments of this application, the receive end device performs, based on the retransmission process identifier included in each piece of transmission control information, the retransmission control operation on the transmit end device that sends the piece of transmission control information, so that this helps resolve a problem that an error occurs when the receive end device restores transmitted data, and avoid an error in restoring the transmitted data by the receive end device.

In some embodiments, the determining a transmit end device that sends the piece of transmission control information includes: determining, based on a port group in which a DMRS port indicated by a demodulation reference signal DMRS port number included in the piece of transmission control information is located, the transmit end device that sends the piece of transmission control information.

In some embodiments, the determining a transmit end device that sends the piece of transmission control information includes: determining, based on a transmission resource occupied by the piece of transmission control information, the transmit end device that sends the piece of transmission control information.

In some embodiments of this application, based on the port group in which the DMRS port indicated by the DMRS port number included in each piece of transmission control information is located or based on the transmission resource occupied by each piece of transmission control information, the transmit end device that sends each piece of transmission control information is determined, thereby helping determine the transmit end device that sends the transmission control information.

According to at least one embodiment, a mode indication method is provided, where the method includes:

generating mode indication information, where the mode indication information is used to indicate a joint transmission mode; and sending the mode indication information.

According to the mode indication method provided in some embodiments of this application, the transmit end device can generate the mode indication information and send the mode indication information to the receive end device, so that the receive end device can determine a joint transmission mode of the receive end device based on the mode indication information, and perform a retransmission control operation on the transmit end device based on the joint transmission mode of the receive end device, thereby helping improve accuracy of performing the retransmission control operation by the receive end device.

According to at least one embodiment, a mode determining method is provided, where the method includes:

receiving mode indication information, where the mode indication information is used to indicate a joint transmission mode; and determining the joint transmission mode based on the mode indication information.

According to some embodiments of the mode determining method provided in this application, the receive end device can determine, based on the mode indication information, the joint transmission mode of the receive end device, and perform a retransmission control operation on the transmit end device based on the joint transmission mode of the receive end device, thereby helping improve accuracy of performing the retransmission control operation by the receive end device.

In some embodiments, in the second aspect or the third aspect, the joint transmission mode is a joint transmission mode of a plurality of pieces of transmission control information or a joint transmission mode of a single piece of transmission control information.

In some embodiments, in the second aspect or the third aspect, the joint transmission mode of a plurality of pieces of transmission control information is a mode in which a plurality of transmit end devices transmit data to a receive end device, and transmission control information sent by each of the plurality of transmit end devices to the receive end device is used to control data transmission from the transmit end device to the receive end device; and the joint transmission mode of a single piece of transmission control information is a mode in which a plurality of transmit end devices transmit data to a receive end device, and transmission control information sent by one of the plurality of transmit end devices to the receive end device is used to control data transmission from the plurality of transmit end devices to the receive end device.

According to at least one embodiment, a receive end device is provided, where the receive end device includes at least one module, and the at least one module is configured to implement the data transmission method provided in any of the embodiments disclosed herein.

According to at least one embodiment, a transmit end device is provided, where the transmit end device includes at least one module, and the at least one module is configured to implement the mode indication method provided in any of the embodiments disclosed herein.

According to at least one embodiment, a receive end device is provided, where the receive end device includes at least one module, and the at least one module is configured to implement the mode determining method according to any of the embodiments disclosed herein.

According to at least one embodiment, a receive end device is provided, where the receive end device includes a processor, a transmitter, and a receiver;

the transmitter and the receiver are used by the receive end device to communicate with a transmit end device; and the processor is configured to execute an instruction to implement the data transmission method provided in any of the embodiments disclosed herein.

According to at least one embodiment, a transmit end device is provided, where the transmit end device includes a processor, a transmitter, and a receiver;

the transmitter and the receiver are used by the transmit end device to communicate with a receive end device; and the processor is configured to execute an instruction to implement the mode indication method provided in any of the embodiments disclosed herein. According to at least one embodiment, a receive end device is provided, where the receive end device includes a processor, a transmitter, and a receiver;

the transmitter and the receiver are used by the receive end device to communicate with a transmit end device; and the processor is configured to execute an instruction to implement the mode determining method according to any of the embodiments disclosed herein.

According to at least one embodiment, a processing apparatus is provided, where the processing apparatus includes a processor and a memory, the processor is configured to execute an instruction stored in the memory, and the processor executes the instruction to implement the data transmission method provided in any of the embodiments disclosed herein.

According to at least one embodiment, a processing apparatus is provided, where the processing apparatus includes a processor and a memory, the processor is configured to execute an instruction stored in the memory, and the processor executes the instruction to implement the mode indication method provided in any of the embodiments disclosed herein.

According to at least one embodiment, a processing apparatus is provided, where the processing apparatus includes a processor and a memory, the processor is configured to execute an instruction stored in the memory, and the processor executes the instruction to implement the mode determining method according to any of the embodiments disclosed herein.

According to at least one embodiment, a computer-readable storage medium is provided, where the computer-readable storage medium stores an instruction, and when the instruction is run on a processing component of a computer, the processing component is enabled to perform the data transmission method according to any of the embodiments disclosed herein.

According to at least one embodiment, a computer-readable storage medium is provided, where the computer-readable storage medium stores an instruction, and when the instruction is run on a processing component of a computer, the processing component is enabled to perform the mode indication method according to any of the embodiments disclosed herein.

According to at least one embodiment, a computer-readable storage medium is provided, where the computer-readable storage medium stores an instruction, and when the instruction is run on a processing component of a computer, the processing component is enabled to perform the mode determining method according to any of the embodiments disclosed herein.

According to at least one embodiment, a processing apparatus is provided, where the processing apparatus includes at least one circuit, and the at least one circuit is configured to perform the data transmission method according to any of the embodiments disclosed herein.

According to at least one embodiment, a processing apparatus is provided, where the processing apparatus includes at least one circuit, and the at least one circuit is configured to perform the mode indication method according to any of the embodiments disclosed herein.

According to at least one embodiment, a processing apparatus is provided, where the processing apparatus includes at least one circuit, and the at least one circuit is configured to perform the mode determining method according to any of the embodiments disclosed herein.

According to at least one embodiment, a computer program product including an instruction is provided, where when the computer program product is run on a processing component of a computer, the processing component is enabled to perform the data transmission method according to any of the embodiments disclosed herein.

According to at least one embodiment, a computer program product including an instruction is provided, where when the computer program product is run on a processing component of a computer, the processing component is enabled to perform the mode indication method provided in any of the embodiments disclosed herein.

According to at least one embodiment, a computer program product including an instruction is provided, where when the computer program product is run on a processing component of a computer, the processing component is enabled to perform the mode determining method according to any of the embodiments disclosed herein.

According to at least one embodiment, a processing apparatus is provided, where the apparatus is configured to implement the method according to any of the embodiments disclosed herein.

The technical solutions of some embodiments provided in this application have the following beneficial effects.

According to some embodiments of the data transmission method, the mode indication method, the mode determining method, and the apparatus that are provided in this application, the receive end device receives the at least one piece of transmission control information, determines the transmit end device that sends each piece of transmission control information, and based on the retransmission process identifier included in the piece of transmission control information, performs the retransmission control operation on the transmit end device that sends the transmission control information. The receive end device of some embodiments performs, based on the retransmission process identifier included in each piece of transmission control information, the retransmission control operation on the transmit end device that sends the piece of transmission control information, so that this helps resolve a problem that an error occurs when the receive end device restores transmitted data, and avoid an error in restoring the transmitted data by the receive end device.

BRIEF DESCRIPTION OF DRAWINGS

FIG. 5 is a flowchart of a data transmission method according to at least an embodiment of the present application;

FIG. 6 is a block diagram of a receive end device according to at least an embodiment of this application;

DESCRIPTION OF EMBODIMENTS

Figure 1:
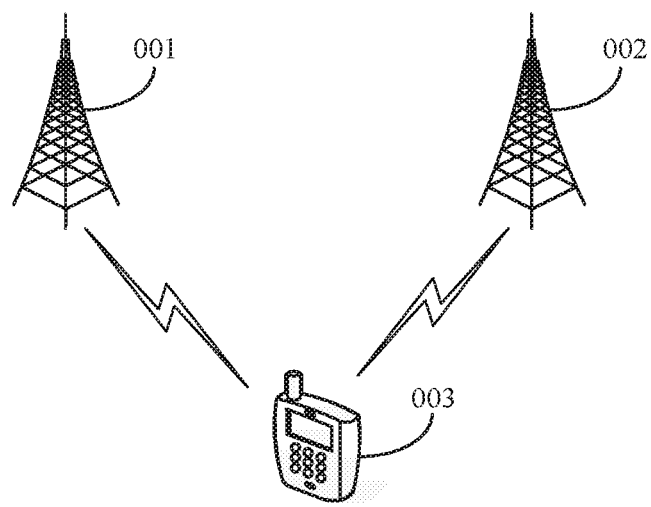
FIG. 1 is a schematic diagram of an implementation environment according to at least an embodiment of this application.

To make a person skilled in the art understand the solutions in the present disclosure better, the following describes several embodiments in more detail with reference to the accompanying drawings and implementations. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure. Currently, a retransmission scheme in an NCJT scenario has not been specifically designed in an NR standard. In this case, in the NCJT scenario, when a plurality of transmit end devices independently send downlink control information to a receive end device to indicate HARQ processes that are allocated by the transmit end devices to the receive end device, the receive end device receives a plurality of pieces of downlink control information, and HARQ process numbers indicated in HARQ process number fields in the plurality of pieces of downlink control information may be repeated, causing an error when the receive end device restores transmitted data (that is, data sent by the transmit end devices) based on retransmitted data. For example, a HARQ process number indicated in downlink control information sent by a transmit end device 1 to a receive end device is the same as a HARQ process number indicated in downlink control information sent by a transmit end device 2 to the receive end device. When the receive end device combines retransmitted data and initially transmitted data to restore transmitted data, because the receive end device does not know whether the retransmitted data is data sent by the transmit end device 1 or data sent by the transmit end device 2, the receive end device may combine retransmitted data sent by the transmit end device 1 and initially transmitted data sent by the transmit end device 2, causing an error in restoring the transmitted data.

Rapid development of mobile communications poses higher requirements on performance of user equipment (UE) at a cell edge. A coordinated multipoint (CoMP) technology can improve performance of a communications system, and improve spectral efficiency at the cell edge. Performing coordinated multipoint by using the CoMP technology is an effective way to improve performance of the communications system. The NCJT scenario is an important scenario of the CoMP technology. The NCJT scenario is an NCJT scenario related to an implementation environment of some embodiments of this application. In the NCJT scenario, a receive end device and a plurality of transmit end devices are included. Each of the plurality of transmit end devices establishes a communication connection with the receive end device, and each transmit end device can schedule the receive end device. When scheduling the receive end device, the transmit end device may send transmission control information including a retransmission process identifier to the receive end device, and the receive end device may perform, based on the retransmission process identifier included in the transmission control information, a retransmission control operation on the transmit end device that sends the transmission control information. A retransmission process is, for example, a HARQ process in LTE, the retransmission process identifier is, for example, a HARQ process number in LTE, and the transmission control information is, for example, DCI in LTE.

According to a latest progress of the 3rd generation partnership project (3GPP), in the NCJT scenario, a plurality of transmit end devices may simultaneously schedule the receive end device in one scheduling period. Therefore, within one scheduling period, the receive end device may be in a joint transmission mode of a plurality of pieces of transmission control information or a joint transmission mode of a single piece of transmission control information. Specifically, when the plurality of transmit end devices simultaneously schedule the receive end device, each of the plurality of transmit end devices may independently send transmission control information to the receive end device, and the transmission control information sent by the transmit end device to the receive end device is used to control data transmission from the transmit end device to the receive end device. In this case, the receive end device may receive a plurality of pieces of transmission control information, and the receive end device is in the joint transmission mode of a plurality of pieces of transmission control information. When the plurality of transmit end devices simultaneously schedule the receive end device, one of the plurality of transmit end devices may send transmission control information to the receive end device, the transmission control information may include control information of the plurality of transmit end devices on the receive end device, and the transmission control information sent by the transmit end device to the receive end device is used to control data transmission from the plurality of transmit end devices to the receive end device. In this case, the receive end device may receive one piece of transmission control information, and the receive end device is in the joint transmission mode of a single piece of transmission control information. It should be noted that, when the receive end device is in the joint transmission mode of a single piece of transmission control information, in specific implementation, one of the plurality of transmit end devices is a serving transmit end device, and the other transmit end devices are coordinating transmit end devices. The coordinating transmit end device may send control information of the coordinating transmit end device on the receive end device to the serving transmit end device, and then the serving transmit end device encapsulates both the received control information and control information of the serving transmit end device on the receive end device into transmission control information, and sends the transmission control information to the receive end device.

In an implementation environment of some embodiments of this application, in different joint transmission modes, the receive end device may perform a retransmission control operation on the transmit end device by using different methods. Therefore, before the transmit end device schedules the receive end device, the transmit end device (for example, the serving transmit end device) may first send mode indication information to the receive end device, to notify the receive end device of a joint transmission mode to be used, and then the transmit end device sends transmission control information to the receive end device, so that the receive end device performs a retransmission control operation on the transmit end device by using different methods. This helps improve accuracy of performing the retransmission control operation by the receive end device. If the receive end device is in the joint transmission mode of a plurality of pieces of transmission control information, when the receive end device receives at least one piece of transmission control information, the receive end device may first determine a transmit end device that sends each of the at least one piece of transmission control information, and then perform, based on a retransmission process identifier in the piece of transmission control information, a retransmission control operation on the transmit end device that sends the piece of transmission control information. The receive end device can perform, based on the retransmission process identifier in the piece of transmission control information, the retransmission control operation on the transmit end device that sends the piece of transmission control information, so that an error in restoring transmitted data by the receive end device can be avoided.

In the implementation environment of some embodiments of this application: the transmit end device may be a transmission reception point (TRP) device, for example but not limited to, a base transceiver station (BTS) in a global system for mobile communications (GSM), an NB (NodeB) in a wideband code division multiple access (WCDMA) system, an evolved NodeB (eNB), a relay node, a vehicle-mounted device, and a wearable device in LTE, and an access network device in a future 5G communications system or an access network device in a future evolved public land mobile network (PLMN) network.

The receive end device may be user equipment. The user equipment may be UE in a general sense. In addition, the user equipment may be a mobile station, an access terminal, a subscriber unit, a subscriber station, a mobile station, a remote station, a remote terminal, a mobile device, a user terminal, a terminal, a wireless communications device, a user agent, a user apparatus, or the like. The user equipment may be a cellular phone, a cordless telephone set, a session initiation protocol (SIP) phone, a wireless local loop (WLL) station, a handheld device having a wireless communication function, a computing device, another processing device connected to a wireless modem, a vehicle-mounted device, a wearable device, and a mobile station in a future 5G network or a terminal device in a future evolved PLMN network. In addition, the user equipment may further include another device such as a relay (Relay) that can communicate with an access network device.

Figure 2:
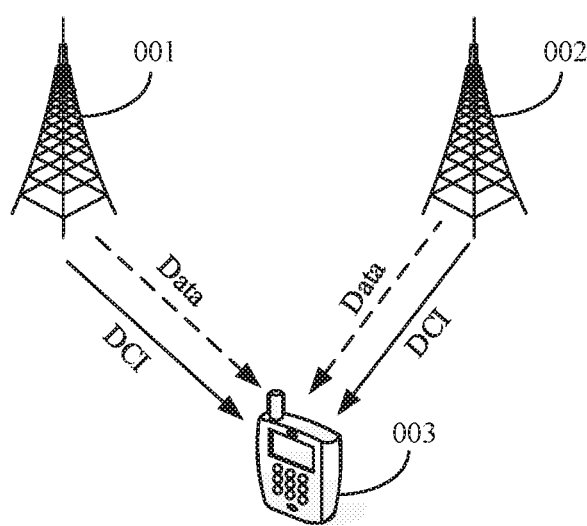
FIG. 2 is a schematic diagram of a method for scheduling a same receive end by a plurality of transmit end devices according to at least an embodiment of this application.
Figure 3:
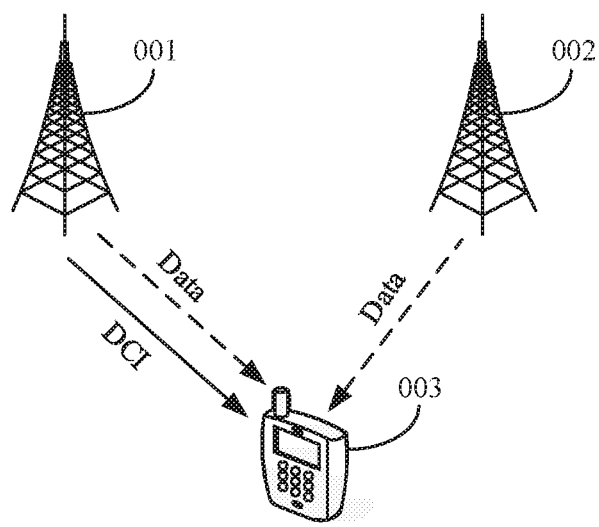
FIG. 3 is a schematic diagram of another method for scheduling a same receive end by a plurality of transmit end devices according to at least an embodiment of this application.

As shown in FIG. 1, an implementation environment of some embodiments of this application is described by using an example in which the plurality of transmit end devices include a transmit end device 001 and a transmit end device 002, the receive end device is a receive end device 003, both the transmit end device 001 and the transmit end device 002 are TRP devices, and the receive end device 003 is UE. The transmit end device 001 and the transmit end device 002 each establish a communication connection with the receive end device 003. Both the transmit end device 001 and the transmit end device 002 can schedule the receive end device 003. In a scheduling period, when the transmit end device 001 and the transmit end device 002 simultaneously schedule the receive end device 003, as shown in FIG. 2, the transmit end device 001 and the transmit end device 002 independently send transmission control information to the receive end device 003 (FIG. 2 is described by using an example in which the transmission control information is DCI). The transmission control information sent by the transmit end device 001 to the receive end device 003 is used to control data transmission from the transmit end device 001 to the receive end device 003, and the transmission control information sent by the transmit end device 002 to the receive end device 003 is used to control data transmission from the transmit end device 002 to the receive end device 003. In this case, the receive end device 003 may receive two pieces of transmission control information, and the receive end device 003 is in the joint transmission mode of a plurality of pieces of transmission control information. When the transmit end device 001 and the transmit end device 002 simultaneously schedule the receive end device 003, as shown in FIG. 3, the transmit end device 001 (or the transmit end device 002) sends transmission control information to the receive end device 003 (FIG. 3 is described by using an example in which the transmission control information is DCI). The transmission control information may include control information of the transmit end device 001 and the transmit end device 002 on the receive end device 003, and the transmission control information sent by the transmit end device 001 (or the transmit end device 002) to the receive end device 003 is used to control data transmission from the transmit end device 001 and the transmit end device 002 to the receive end device 003. In this case, the receive end device 003 may receive one piece of transmission control information, and the receive end device 003 is in the joint transmission mode of a single piece of transmission control information.

The transmit end device 001 (or the transmit end device 002) may send mode indication information to the receive end device 003, to notify the receive end device 003 of a joint transmission mode to be used. Then, the transmit end device 001 and the transmit end device 002 send transmission control information to the receive end device 003 (as shown in FIG. 2, the transmit end device 001 and the transmit end device 002 independently send transmission control information to the receive end device 003; or, as shown in FIG. 3, one of the transmit end device 001 and the transmit end device 002 sends transmission control information to the receive end device 003). When the receive end device 003 receives at least one piece of transmission control information, the receive end device 003 may first determine a transmit end device that sends each of the at least one piece of transmission control information, and then perform, based on a retransmission process identifier in the piece of transmission control information, a retransmission control operation on the transmit end device that sends the piece of transmission control information. That the transmit end device 003 performs, based on a retransmission process identifier in the piece of transmission control information, a retransmission control operation on the transmit end device that sends the piece of transmission control information is as follows: The transmit end device 003 restores, by using a retransmission process indicated by the retransmission process identifier in each piece of transmission control information, data (Data) sent by the transmit end device that sends the piece of transmission control information. The retransmission control operation may be, for example, a HARQ operation in LTE. For example, when the receive end device 003 receives two pieces of transmission control information: transmission control information 1 and transmission control information 2, the receive end device 003 may determine a transmit end device that sends the transmission control information 1 and a transmit end device that sends the transmission control information 2. Assuming that the transmit end device that sends the transmission control information 1 is the transmit end device 001, and the transmit end device that sends the transmission control information 2 is the transmit end device 002, the receive end device 003 performs a retransmission control operation on the transmit end device 001 based on a retransmission process identifier in the transmission control information 1, and performs a retransmission control operation on the transmit end device 002 based on a retransmission process identifier in the transmission control information 2. In this way, when the receive end device 003 combines retransmitted data and initially transmitted data to restore transmitted data, the receive end device 003 may combine retransmitted data sent by the transmit end device 001 and initially transmitted data sent by the transmit end device 001 to restore transmitted data of the transmit end device 001, and combine retransmitted data sent by the transmit end device 002 and initially transmitted data sent by the transmit end device 002 to restore transmitted data of the transmit end device 002, thereby avoiding a problem that an error occurs in restoring the transmitted data when the receive end device 003 combines the retransmitted data sent by the transmit end device 001 and the transmitted data sent by the transmit end device 002 to restore the transmitted data.

Figure 4:
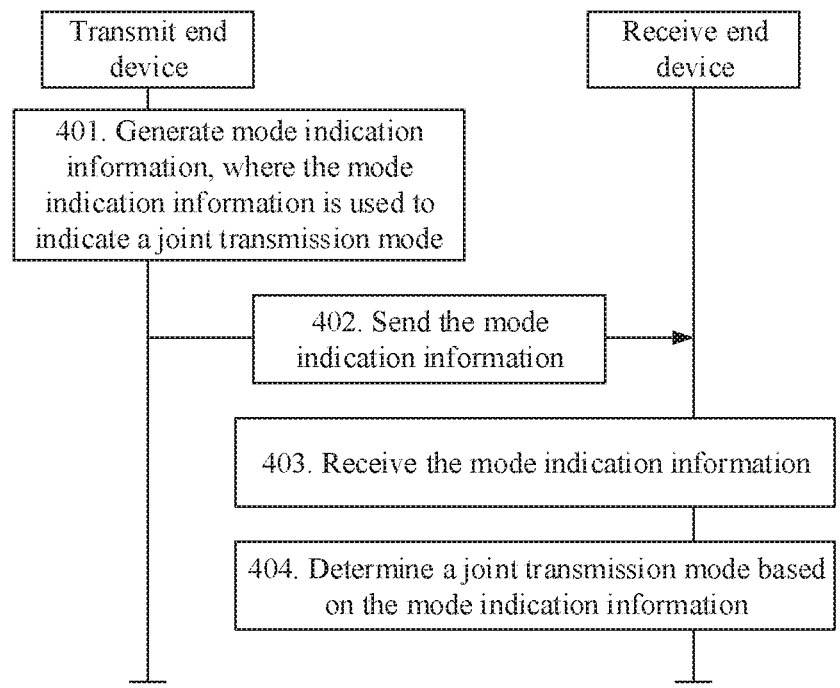
FIG. 4 is a flowchart of a mode indication method according to at least an embodiment of this application.

FIG. 4 is a flowchart of a mode indication method according to an embodiment of this application. In FIG. 4, the mode indication method and a mode determining method are combined in description. The mode indication method may be used in an NCJT scenario, and may be specifically used in the implementation environment shown in FIG. 1. Referring to FIG. 4, the mode indication method includes the following steps.

Step 401. A transmit end device generates mode indication information, where the mode indication information is used to indicate a joint transmission mode.

In at least this embodiment of this application, the transmit end device (for example, a serving transmit end device) may obtain a scheduling manner of scheduling a same receive end device by each of a plurality of transmit end devices in a preset time period, then determine, based on the scheduling manners of the plurality of transmit end devices, a joint transmission mode of the receive end device, and generate mode indication information based on the joint transmission mode of the receive end device. The scheduling manner of scheduling the receive end device by the transmit end device may include that: the transmit end device independently schedules the receive end device or the transmit end device schedules the receive end device by using another transmit end device. The mode indication information is used to indicate a joint transmission mode, and is specifically a joint transmission mode of the receive end device within a preset time period. The mode indication information may be specifically link layer signaling. For example, the mode indication information may be media access control (MAC) layer signaling or radio resource control (RRC) signaling. The joint transmission mode is a joint transmission mode of a plurality of pieces of transmission control information or a joint transmission mode of a single piece of transmission control information. The joint transmission mode of a plurality of pieces of transmission control information is a mode in which a plurality of transmit end devices transmit data to a receive end device, and transmission control information sent by each of the plurality of transmit end devices to the receive end device is used to control data transmission from the transmit end device to the receive end device; and the joint transmission mode of a single piece of transmission control information is a mode in which a plurality of transmit end devices transmit data to a receive end device, and transmission control information sent by one of the plurality of transmit end devices to the receive end device is used to control data transmission from the plurality of transmit end devices to the receive end device. In at least this embodiment of this application, the transmission control information is, for example, DCI in LTE, the joint transmission mode of a plurality of pieces of transmission control information is, for example, a mode corresponding to the data transmission scenario shown in FIG. 2, and the joint transmission mode of a single piece of transmission control information is, for example, a mode corresponding to the data transmission scenario shown in FIG. 3. The transmit end device may be any transmit end device in the implementation environment shown in FIG. 1, and the receive end device may be the receive end device 003 in the implementation environment shown in FIG. 1. This embodiment of this application is described by using an example in which the transmit end device is the transmit end device 001 in the implementation environment shown in FIG. 1. In this case, the transmit end device 001 may obtain a scheduling manner of scheduling the receive end device 003 by each of the transmit end device 001 and the transmit end device 002 in a preset time period, and then generate the mode indication information based on the scheduling manners of scheduling the receive end device 003 by the transmit end device 001 and the transmit end device 002. The mode indication information is used to indicate a joint transmission mode of the receive end device 003 in the preset time period. It should be noted that this embodiment of this application is described by using an example in which the transmit end device 001 is a transmit end device that schedules the receive end device 003 in the preset time period. In actual application, the transmit end device 001 may be a transmit end device that schedules the receive end device 003 not in the preset time period. This is not limited in this embodiment of this application. The preset time period is a time period between a moment at which the receive end device currently receives the mode indication information and a moment at which the receive end device receives the mode indication information next time, the preset time period may change, and the preset time period is greater than one scheduling period. For example, the preset time interval is greater than one transmission time interval (TTI).

In some embodiments, that the transmit end device obtains a scheduling manner of scheduling a same receive end device by each of a plurality of transmit end devices in a preset time period may include: Each of the plurality of transmit end devices reports a scheduling manner of the transmit end device for each receive end device to a network control device. After receiving the scheduling manners sent by the transmit end devices, the network control device determines the scheduling manners of the transmit end devices for a same receive end device, and sends the scheduling manners of the transmit end devices for the same receive end device to one of the plurality of transmit end devices. The transmit end device receives the scheduling manners that are of the transmit end devices for the same receive end device and that are sent by the network control device, to obtain the scheduling manner of each of the plurality of transmit end devices for the same receive end device in the preset time period. Alternatively, the plurality of transmit end devices include one serving transmit end device and a plurality of coordinating transmit end devices. Each coordinating transmit end device may send a scheduling manner of the coordinating transmit end device for each receive end device to the serving transmit end device. After receiving the scheduling manners sent by the transmit end devices, the serving transmit end device determines scheduling manners of the transmit end devices for a same receive end device, to obtain the scheduling manner of each of the plurality of transmit end devices for the same receive end device in the preset time period. It should be noted that, that the transmit end device obtains a scheduling manner of scheduling a same receive end device by each of a plurality of transmit end devices in a preset time period, as provided in at least this embodiment of this application is merely an example. In actual application, alternatively, the transmit end device may obtain, in another manner, the scheduling manner in which each of the plurality of transmit end devices schedules the same receive end device in the preset time period. This is not limited in this embodiment of this application.

In at least this embodiment of this application, the transmit end device may maintain a correspondence between a joint transmission mode and a mode parameter value (or a mode parameter sequence). The correspondence records a mode parameter value (or a mode parameter sequence) corresponding to each joint transmission mode, and in addition, the correspondence is agreed upon in advance by the transmit end device and the receive end device or predefined in a standard. After determining a joint transmission mode of the receive end device, the transmit end device may query the correspondence between a joint transmission mode and a mode parameter value based on the joint transmission mode of the receive end device, to obtain a mode parameter value corresponding to the joint transmission mode of the receive end device, and generate mode indication information based on the mode parameter value corresponding to the joint transmission mode of the receive end device. For example, the correspondence between a joint transmission mode and a mode parameter value that is maintained by the transmit end device may be shown in Table 1.

TABLE 1

| Mode parameter value | Joint transmission mode |
|---|---|
| 0 | Joint transmission mode of a single piece of transmission control information |
| 1 | Joint transmission mode of a plurality of pieces of transmission control information |

Referring to Table 1, a joint transmission mode corresponding to a mode parameter value, to be specific, 0, is the joint transmission mode of a single piece of transmission control information, and a joint transmission mode corresponding to a mode parameter value, to be specific, 1, is the joint transmission mode of a plurality of pieces of transmission control information. Assuming that the transmit end device determines that the joint transmission mode of the receive end device is the joint transmission mode of a plurality of pieces of transmission control information, the transmit end device may determine, based on the correspondence shown in Table 1, that the mode parameter value corresponding to the joint transmission mode of the receive end device is 1. Therefore, the transmit end device generates the mode indication information based on the mode parameter value, to be specific, 1. For example, the transmit end device 001 generates the mode indication information based on the mode parameter value, to be specific, 1.

It should be noted that, this embodiment of this application is described by using an example in which the transmit end device obtains the scheduling manner of scheduling the same receive end device by each of the plurality of transmit end devices in the preset time period, and determines the joint transmission mode of the receive end device based on the scheduling manners of the plurality of transmit end devices. In actual application, the transmit end device may alternatively obtain a maximum quantity of transmit end devices that schedule a same receive end device in the preset time period, and then determine the joint transmission mode of the receive end device based on the maximum quantity. In some embodiments, when the transmit end device determines that the maximum quantity of transmit end devices that schedule a same receive end device in the preset time period is equal to 0, the transmit end device determines that the joint transmission mode of the receive end device is the joint transmission mode of a single piece of transmission control information; or when the transmit end device determines that the maximum quantity of transmit end devices that schedule a same receive end device in the preset time period is greater than 0, the transmit end device determines that the joint transmission mode of the receive end device is the joint transmission mode of a plurality of pieces of transmission control information. Details are not described herein in this embodiment of this application.

Step 402: The transmit end device sends the mode indication information to the receive end device.

After generating the mode indication information, the transmit end device may send the mode indication information to the receive end device. The mode indication information may be MAC layer signaling or RRC signaling. The mode indication information is used to indicate the joint transmission mode. The mode indication information is specifically the joint transmission mode of the receive end device within the preset time period. For example, a description is provided still by using the example in which the transmit end device is the transmit end device 001 in the implementation environment shown in FIG. 1 and the receive end device is the receive end device 003 in the implementation environment shown in FIG. 1. In this case, the transmit end device 001 sends mode indication information to the receive end device 003, and the mode indication information indicates the joint transmission mode of the receive end device 003 in the preset time period.

It should be noted that, this embodiment of this application is described by using an example in which the mode indication information is MAC layer signaling or RRC signaling. The MAC layer signaling or the RRC signaling is usually signaling transmitted between the transmit end device and the receive end device after the receive end device accesses the transmit end device. In actual application, alternatively, the mode indication information may not be MAC layer signaling or RRC signaling. For example, the mode indication information may be a system message. The transmit end device may send (for example, broadcast) the mode indication information to the receive end device when the receive end device accesses the transmit end device. Certainly, the transmit end device may alternatively send the mode indication information to the receive end device in another manner. This is not limited in this embodiment of this application.

Step 403: The receive end device receives the mode indication information sent by the transmit end device.

The receive end device may receive the mode indication information sent by the transmit end device. The mode indication information may be MAC layer signaling or RRC signaling. The mode indication information is used to indicate the joint transmission mode. The mode indication information is specifically the joint transmission mode of the receive end device (which is the execution body of step 403) within the preset time period. For example, corresponding to step 402, the receive end device 003 receives the mode indication information sent by the transmit end device 001. The mode indication information indicates the joint transmission mode of the receive end device 003 in the preset time period.

Step 404: The receive end device determines a joint transmission mode based on the mode indication information.

The determining, by the receive end device, a joint transmission mode based on the mode indication information is: determining, by the receive end device based on the mode indication information, the joint transmission mode of the receive end device. In some embodiments, the receive end device may parse the mode indication information to obtain a mode parameter value (or a mode parameter sequence), and then determine, based on the mode parameter value (or the mode parameter sequence), the joint transmission mode of the receive end device.

In at least this embodiment of this application, the receive end device may maintain a correspondence between a joint transmission mode and a mode parameter value (or a mode parameter sequence). The correspondence records a mode parameter value (or a mode parameter sequence) corresponding to each joint transmission mode, and in addition, the correspondence is agreed upon in advance by the transmit end device and the receive end device or predefined in a standard. After parsing the mode indication information to obtain a mode parameter value, the receive end device may query the correspondence between a joint transmission mode and a mode parameter value (or a mode parameter sequence) based on the mode parameter value, to obtain a joint transmission mode corresponding to the mode parameter value (or the mode parameter sequence), and determine the joint transmission mode as the joint transmission mode of the receive end device. For example, corresponding to step 401, the correspondence between a joint transmission mode and a mode parameter value that is maintained by the receive end device may be shown in Table 1. Assuming that a mode parameter value obtained by the receive end device by parsing the mode indication information is 1, the receive end device may obtain, by querying the correspondence shown in Table 1 based on the mode parameter value, to be specific, 1, that the joint transmission mode corresponding to the mode parameter value, to be specific, 1, is the joint transmission mode of a plurality of pieces of transmission control information. Therefore, the receive end device determines that the joint transmission mode of a plurality of pieces of transmission control information is the joint transmission mode of the receive end device. For example, the receive end device 003 determines the joint transmission mode of the transmission control information as the joint transmission mode of the receive end device 003.

In conclusion, according to the mode indication method provided in at least this embodiment of this application, the transmit end device can generate the mode indication information and send the mode indication information to the receive end device, so that the receive end device can determine a joint transmission mode of the receive end device based on the mode indication information, and perform a retransmission control operation on the transmit end device based on the joint transmission mode of the receive end device, thereby helping improve accuracy of performing the retransmission control operation by the receive end device.

FIG. 5 is a flowchart of a data transmission method according to an embodiment of this application. The data transmission method may be applied to an NCJT scenario, and may be specifically applied to the implementation environment shown in FIG. 1. FIG. 5 is described by using an example in which a receive end device is in a joint transmission mode of a plurality of pieces of transmission control information. Referring to FIG. 5, the data transmission method includes the following steps.

Step 501: The receive end device receives at least one piece of transmission control information, where the at least one piece of transmission control information includes transmission control information sent by at least one of a plurality of transmit end devices to the receive end device, and transmission control information sent by each of the at least one transmit end device to the receive end device includes a retransmission process identifier used in a retransmission control operation that is performed on data transmission from the transmit end device to the receive end device.

In at least this embodiment of this application, the receive end device may receive at least one piece of transmission control information, and the at least one piece of transmission control information includes transmission control information sent by at least one of a plurality of transmit end devices to the receive end device, transmission control information sent by each of the at least one transmit end device to the receive end device includes a retransmission process identifier used in a retransmission control operation that is performed on data transmission from the transmit end device to the receive end device. Specifically, one of the at least one piece of transmission control information is sent by one transmit end device to the receive end device, and the transmission control information sent by each transmit end device to the receive end device includes a retransmission process identifier used in a retransmission control operation that is performed on data transmission from the transmit end device to the receive end device. The transmission control information is, for example, DCI in LTE, a retransmission process is, for example, a HARQ process in LTE, and the retransmission process identifier is, for example, a HARQ process number in LTE.

For example, the implementation environment shown in FIG. 1 is used as an example. It is assumed that the receive end device 003 receives two pieces of transmission control information, the at least one transmit end device includes the transmit end device 001 and the transmit end device 002, transmission control information sent by the transmit end device 001 to the receive end device 003 includes a retransmission process identifier ID-001, and transmission control information sent by the transmit end device 002 to the receive end device 003 includes a retransmission process identifier ID-002. In this case, the retransmission process identifier ID-001 is a retransmission process identifier used in a retransmission control operation that is performed on data transmission from the transmit end device 001 to the receive end device 003, and the retransmission process identifier ID-002 is a retransmission process identifier used in a retransmission control operation that is performed on data transmission from the transmit end device 002 to the receive end device 003.

In at least this embodiment of this application, the transmission control information is carried on a PDCCH, and the receive end device may receive the at least one piece of transmission control information by performing blind detection on the PDCCH. In some embodiments, the receive end device may receive the at least one piece of transmission control information by performing blind detection on all search spaces of the PDCCH. Alternatively, before sending the transmission control information to the receive end device, the transmit end device may send quantity indication information to the receive end device. The quantity indication information indicates a maximum quantity of pieces of transmission control information that may be received by the receive end device, and the receive end device may perform blind detection on the PDCCH based on the quantity indicated by the quantity indication information. When the receive end device blindly detects the quantity of pieces of transmission control information indicated by the quantity indication information, the receive end device may stop blind detection, to reduce complexity of blind detection performed by the receive end device.

Step 502: For each of the at least one piece of transmission control information, the receive end device determines a transmit end device that sends the piece of transmission control information.

After the receive end device receives the at least one piece of transmission control information, for each of the at least one piece of transmission control information, the receive end device may determine the transmit end device that sends the piece of transmission control information. In at least this embodiment of this application, the receive end device may determine, in either of the following two manners, the transmit end device that sends the piece of transmission control information.

First implementation: The receive end device determines, based on a port group in which a DMRS port indicated by a demodulation reference signal (DMRS) port number included in each piece of transmission control information is located, the transmit end device that sends the piece of transmission control information.

Specifically, a plurality of DMRS ports may be grouped to obtain a plurality of port groups, each port group includes at least one DMRS port, and the DMRS ports in a same port group meet a quasi-co-location (QCL) relationship. One transmit end device may allocate DMRS ports to each of a plurality of transmit end devices, the DMRS ports allocated to a same transmit end device belong to a same port group, and each transmit end device may send data to the receive end device by using the DMRS ports allocated by the transmit end device to the transmit end device. In at least this embodiment of this application, the step of grouping a plurality of DMRS ports to obtain a plurality of port groups may be performed by the transmit end device, or may be predefined in a standard. That is, one transmit end device may group a plurality of DMRS ports to obtain a plurality of port groups, and then allocate DMRS ports to each of the plurality of transmit end devices, where the DMRS ports allocated to a same transmit end device belong to one of the plurality of port groups obtained by the transmit end device by grouping the plurality of DMRS ports; or a plurality of port groups are predefined in a standard, each port group includes at least one DMRS port, a transmit end device allocates DMRS ports to each of a plurality of transmit end devices, and the DMRS ports allocated to a same transmit end device belong to a same port group in the plurality of port groups predefined in the standard. It should be noted that, when a transmit end device allocates DMRS ports to a plurality of transmit end devices, all DMRS ports in a port group may be allocated to one transmit end device (that is, the port group is allocated to the transmit end device), or some DMRS ports in a port group may be allocated to the transmit end device. This is not limited in this embodiment of this application. In addition, when one transmit end device includes a plurality of antenna panels, DMRS ports allocated to a same antenna panel usually belong to a same port group, and DMRS ports allocated to different antenna panels may belong to different port groups.

After allocating DMRS ports to each of the plurality of transmit end devices, the transmit end device may generate port group information, and send the port group information to the receive end device. The port group information indicates each port group, and may specifically indicate DMRS ports that belong to a same port group. Specifically, the port group information may include a DMRS port number, and the DMRS port number is used to indicate a DMRS port, and further indicate DMRS ports belonging to a same port group. The receive end device may determine, based on the port group information, the DMRS ports belonging to the same port group. In addition, division into a port group may alternatively be agreed upon in advance in a standard. In this way, the transmit end device does not need to send port group information to the receive end device, and the port group information is known to the receive end device. Transmission control information sent by each transmit end device to the receive end device may include a DMRS port number of a DMRS port used by the transmit end device. The receive end device may parse each piece of transmission control information to obtain a DMRS port number in the piece of transmission control information, determine a DMRS port based on the DMRS port number, further determine a port group to which the DMRS port belongs, and determine, based on the port group to which the DMRS port belongs, the transmit end device that sends the piece of transmission control information. It should be noted that, in actual application, DMRS ports indicated by DMRS port numbers in transmission control information sent by a same transmit end device to the receive end device belong to a same port group, and DMRS ports indicated by DMRS port numbers in transmission control information sent by different transmit end devices to the receive end device belong to different port groups. That the receive end device determines, based on a port group to which a DMRS port belongs, the transmit end device that sends the piece of transmission control information is as follows: The receive end device determines, based on the port group to which the DMRS port belongs, whether transmit end devices that send different transmission control information are a same transmit end device or different transmit end devices.

For example, a plurality of DMRS ports include eight DMRS ports, to be specific, a DMRS port 1 to a DMRS port 8. The DMRS port 1 to the DMRS port 8 are divided into two port groups, the DMRS port 1 to the DMRS port 4 belong to one port group, and the DMRS port 5 to the DMRS port 8 belong to the other port group. Therefore, port group information generated by the transmit end device may include the following information: {1, 2, 3, 4} and {5, 6, 7, 8}. 1 to 8 in the port group information all indicate DMRS port numbers, 1 indicates the DMRS port 1, 2 indicates the DMRS port 2, and so on. It can be learned that the port group information indicates two port groups, the DMRS port 1 to the DMRS port 4 belong to one port group, and the DMRS port 5 to the DMRS port 8 belong to the other port group. The implementation environment shown in FIG. 1 is used as an example. The plurality of transmit end devices may include the transmit end device 001 and the transmit end device 002, and the transmit end device 001 (a serving transmit end device) may allocate at least one of the DMRS port 1 to the DMRS port 4 to the transmit end device 001, and allocate at least one of the DMRS port 5 to the DMRS port 8 to the transmit end device 002. The transmit end device 001 may send data to the receive end device 003 by using a DMRS port that is in the DMRS port 1 to the DMRS port 4 and that is allocated by the transmit end device 001 to the transmit end device 001, and the transmit end device 002 may send data to the receive end device 003 by using a DMRS port that is in the DMRS port 5 to the DMRS port 8 and that is allocated by the transmit end device 001 to the transmit end device 002. Each transmit end device (for example, the transmit end device 001) notifies, by using downlink control information, the receive end device 003 of a specific DMRS port used by the transmit end device (for example, the transmit end device 001) to send data to the receive end device 003. It is not difficult to understand that, in an implementation solution in which each port group includes only one DMRS port, the receive end device does not need to identify the port group, but directly determines the corresponding transmit end device based on the DMRS port. In addition, specific implementation details, forms, and the like of the DMRS port are not limited in this embodiment of this application.

It is assumed that the receive end device 003 receives transmission control information 1 and transmission control information 2, the receive end device 003 parses the transmission control information 1 to obtain DMRS port numbers, to be specific, 1 and 3, in the transmission control information 1, and the receive end device 003 parses the transmission control information 2 to obtain DMRS port numbers, to be specific, 5 and 6, in the transmission control information 2. In this case, the receive end device 003 may determine that the transmission control information 1 and the transmission control information 2 are from different transmit end devices, and the transmission control information 1 and the transmission control information 2 correspond to different data transmission, so that based on retransmission process identifiers in the transmission control information, a retransmission control operation can be performed on corresponding data transmission. It can be learned that the receive end device identifies the data transmission based on a port group corresponding to a DMRS port indicated by the transmission control information, and then performs a retransmission control operation on the data transmission based on the retransmission process identifier included in the transmission control information. Simply, determining the transmit end device that sends the transmission control information is actually determining the data transmission corresponding to the transmission control information. In this way, a retransmission control operation can be performed on the data transmission based on the retransmission process identifier included in the transmission control information.

It should be noted that this embodiment of this application is described by using an example in which the transmission control information includes the DMRS port number. In actual application, the transmission control information may not include the DMRS port number, but some fields in the transmission control information are used to indicate the DMRS port number. The receive end device may determine the DMRS port number according to an indication of the transmission control information, and further determine the port group in which the DMRS port indicated by the DMRS port number is located. It should be further noted that an NR standard has been agreed upon currently. DMRS ports may be divided into a plurality of port groups, and DMRS ports in a same port group meet a quasi-co-location QCL relationship. When DMRS ports are allocated to a plurality of transmit end devices, DMRS ports allocated to a same transmit end device usually belong to a same port group. In addition, when one transmit end device includes a plurality of antenna panels, DMRS ports allocated to a same antenna panel usually belong to a same port group, and DMRS ports allocated to different antenna panels usually belong to different port groups.

It should be further noted that this embodiment of this application is described by using an example in which one transmit end device allocates DMRS ports to a plurality of transmit end devices. In actual application, a network side or a network control device may allocate DMRS ports to a plurality of transmit end devices, or a plurality of transmit end devices and a receive end device may agree upon DMRS ports in advance. Certainly, in actual application, the receive end device may alternatively determine, in another manner, DMRS ports used by each transmit end device to send data. This is not limited in this embodiment of this application.

Second implementation: The receive end device determines, based on a transmission resource occupied by each piece of transmission control information, a transmit end device that sends the piece of transmission control information.

Specifically, transmission resources of control channels may be divided to obtain a plurality of transmission resource sets. Each transmission resource set includes at least one transmission resource, each transmission resource may be a control channel resource (CCE), and each transmission resource set may be a control resource set (Control Resource Set). One transmit end device may allocate transmission resources to each of a plurality of transmit end devices, transmission resources allocated to a same transmit end device belong to a same transmission resource set, and each transmit end device may send transmission control information to the receive end device by using the transmission resources allocated by the transmit end device to the transmit end device. In at least this embodiment of this application, the step of dividing transmission resources of control channels to obtain a plurality of transmission resource sets may be performed by the transmit end device, or may be predefined in a standard. That is, one transmit end device may divide transmission resources of control channels to obtain a plurality of transmission resource sets, and then allocate transmission resources to each of the plurality of transmit end devices, where the transmission resources allocated to a same transmit end device belong to one of the plurality of transmission resource sets obtained by the transmit end device by dividing the transmission resources of the control channels; or a plurality of transmission resource sets are predefined in a standard, each transmission resource set includes at least one transmission resource, one transmit end device allocates transmission resources to each of a plurality of transmit end devices, and the transmission resources allocated to a same transmit end device belong to a same transmission resource set in the plurality of transmission resource sets predefined in the standard. It should be noted that, when one transmit end device allocates transmission resources to a plurality of transmit end devices, all transmission resources in a transmission resource set may be allocated to one transmit end device (that is, the transmission resource set is allocated to the transmit end device), or some transmission resources in a transmission resource set may be allocated to the transmit end device. This is not limited in this embodiment of this application. In addition, when one transmit end device includes a plurality of antenna panels, transmission resources allocated to a same antenna panel usually belong to a same transmission resource set, and transmission resources allocated to different antenna panels may belong to different transmission resource sets.

After allocating transmission resources to each of a plurality of transmit end devices, the transmit end device may generate resource set information, and send the resource set information to the receive end device. The resource set information indicates a transmission resource set, and may specifically indicate transmission resources that belong to a same transmission resource set. Specifically, the resource set information may include transmission resource information (for example, a transmission resource location), and the transmission resource information is used to indicate a transmission resource, and further indicate transmission resources that belong to a same transmission resource set. In addition, division into a transmission resource set may alternatively be agreed upon in advance in a standard. In this way, the transmit end device does not need to send the resource set information to the receive end device, and the resource set information is known to the receive end device. The receive end device may determine a transmission resource occupied by each piece of transmission control information, determine a transmission resource set to which the transmission resource occupied by each piece of transmission control information belongs, and determine, based on the transmission resource set to which the transmission resource occupied by each piece of transmission control information belongs, the transmit end device that sends the piece of transmission control information. It should be noted that, in actual application, transmission resources occupied by transmission control information sent by a same transmit end device to the receive end device belong to a same transmission resource set, and transmission resources occupied by transmission control information sent by different transmit end devices to the receive end device belong to different transmission resource sets. The determining, by the receive end device based on a transmission resource set to which a transmission resource occupied by each piece of transmission control information belongs, a transmit end device that sends the piece of transmission control information is: determining, by the receive end device based on the transmission resource set to which the transmission resource occupied by each piece of transmission control information belongs, whether transmit end devices that send different transmission control information are a same transmit end device or different transmit end devices.

For example, transmission resources CCE 1 to CCE 20 of control channels are divided into two transmission resource sets (for example, a transmission resource set S1 and a transmission resource set S2), the CCE 1 to the CCE 10 belong to one transmission resource set (for example, the transmission resource set S1), and the CCE 11 to the CCE 20 belong to the other transmission resource set (for example, the transmission resource set S2). In this case, resource set information generated by the transmit end device may include the following information: {CCE 1, CCE 2, CCE 3, CCE 4, CCE 5, CCE 6, CCE 7, CCE 8, CCE 9, CCE 10}, and {CCE 11, CCE 12, CCE 13, CCE 14, CCE 15, CCE 16, CCE 17, CCE 18, CCE 19, CCE 20}. 1 to 20 in the resource set information all indicate CCE (transmission resource) information. It can be learned that the resource set information indicates two transmission resource sets, the CCE 1 to the CCE 10 belong to one transmission resource set, and the CCE 11 to the CCE 20 belong to the other transmission resource set. The implementation environment shown in FIG. 1 is used as an example. The plurality of transmit end devices may include the transmit end device 001 and the transmit end device 002. The transmit end device 001 (a serving transmit end device) may allocate at least one of the CCE 1 to the CCE 10 to the transmit end device 001, and allocate at least one of the CCE 11 to the CCE 20 to the transmit end device 002. The transmit end device 001 may use a CCE that is in the CCE 1 to CCE 10 and that is allocated by the transmit end device 001 to the transmit end device 001 to send transmission control information to the receive end device 003, and the transmit end device 002 may use a CCE that is in the CCE 11 to the CCE 20 and that is allocated by the transmit end device 001 to the transmit end device 002 to send transmission control information to the receive end device 003. In a specific implementation process, the receive end device may detect the transmission control information through blind detection. After detecting the transmission control information, the receive end device determines, based on a transmission resource on which the detected transmission control information is located, a transmission resource set in which the transmission resource is located, and determines a transmit end device corresponding to the transmission resource set, to determine the transmit end device that sends the transmission control information. It is not difficult to understand that, in an implementation solution in which each transmission resource set includes only one transmission resource, the receive end device does not need to identify the transmission resource set, but directly determines the corresponding transmit end device based on the transmission resource. In addition, specific implementation details, forms, and the like of the transmission resource are not limited in this embodiment of this application. For example, one transmission resource carries one piece of transmission control information, or a plurality of transmission resources carry one piece of transmission control information.

It is assumed that the receive end device 003 receives transmission control information 1 and transmission control information 2, a transmission resource occupied by the transmission control information 1 is the CCE 3, and a transmission resource occupied by the transmission control information 2 is the CCE 12. In this case, the receive end device 003 determines that the transmission control information 1 and the transmission control information 2 are from different transmit end devices, and the transmission control information 1 and the transmission control information 2 correspond to different data transmission, so that based on a retransmission process identifier in the transmission control information, a retransmission control operation can be performed on corresponding data transmission. It can be learned that the receive end device identifies the data transmission based on a transmission resource set to which a transmission resource occupied by the transmission control information belongs, and then performs a retransmission control operation on the data transmission based on the retransmission process identifier included in the transmission control information. Simply, determining the transmit end device that sends the transmission control information is actually determining the data transmission corresponding to the transmission control information. In this way, a retransmission control operation can be performed on the data transmission based on the retransmission process identifier included in the transmission control information.

It should be noted that this embodiment of this application is described by using an example in which one transmit end device allocates transmission resources to a plurality of transmit end devices. In actual application, a network side or a network control device may allocate transmission resources to a plurality of transmit end devices, or a plurality of transmit end devices and a receive end device may agree upon transmission resources in advance. Certainly, in actual application, the receive end device may alternatively determine, in another manner, transmission resources used by each transmit end device to send transmission control information. This is not limited in this embodiment of this application.

Step 503: The receive end device performs, based on a retransmission process identifier included in the piece of transmission control information, a retransmission control operation on the transmit end device that sends the piece of transmission control information.

In at least this embodiment of this application, the transmission control information sent by each transmit end device to the receive end device may include a retransmission process identifier, and the receive end device may perform, based on the retransmission process identifier included in the piece of transmission control information, a retransmission control operation on the transmit end device that sends the piece of transmission control information. Specifically, the receive end device may parse each piece of transmission control information, to obtain a retransmission process identifier included in the piece of transmission control information; then determine, based on the retransmission process identifier, a retransmission process that is allocated to the receive end device by a transmit end device that sends the piece of transmission control information; and perform a retransmission control operation on the corresponding transmit end device by using the retransmission process. Each piece of transmission control information may further indicate a quantity of retransmission processes, and the quantity of retransmission processes indicated by the piece of transmission control information is a quantity of retransmission processes that are allocated to the receive end device by the transmit end device that sends the piece of transmission control information. The receive end device may determine a quantity of retransmission processes indicated by each piece of transmission control information, and determine, based on a retransmission process identifier included in the piece of transmission control information and a quantity of retransmission processes indicated by the piece of transmission control information, a retransmission process that is allocated to the receive end device by the transmit end device that sends the piece of transmission control information. In some embodiments, the quantity of retransmission processes indicated by each piece of transmission control information may be 1 or 2, and a format of the transmission control information indicates the quantity of retransmission processes. The receive end device may determine a format of each piece of transmission control information, and determine, based on the format of the piece of transmission control information, a quantity of retransmission processes indicated by the piece of transmission control information. For example, the transmission control information may be DCI in LTE, a DCI format (format) 1/1A/1B/1D indicates that the quantity of retransmission processes is 1, and a DCI format 2/2A/2B/2C indicates that the quantity of retransmission processes is 2.

In at least this embodiment of this application, in the plurality of transmit end devices, different transmit end devices may correspond to different retransmission process entities, and each retransmission process entity may include at least one retransmission process. Alternatively, a plurality of transmit end devices may correspond to a same retransmission process entity, and the same retransmission process entity includes at least one retransmission process. The retransmission process may be a HARQ process, the retransmission process identifier may be a HARQ process number, and the retransmission process entity may be a HARQ entity. For the two cases, that the receive end device determines, based on a retransmission process identifier included in the piece of transmission control information and a quantity of retransmission processes indicated by the piece of transmission control information, a retransmission process that is allocated to the receive end device by the transmit end device that sends the piece of transmission control information may include the following two aspects:

First aspect: In a plurality of transmit end devices, different transmit end devices correspond to different retransmission process entities, and each retransmission process entity may include at least one retransmission process. The retransmission process entities corresponding to the different transmit end devices are agreed upon in advance by the transmit end devices and the receive end device, or may be predefined in a standard. The receive end device may determine a retransmission process that is allocated to the receive end device by the transmit end device that sends each piece of transmission control information, based on a retransmission process identifier included in the piece of transmission control information and a quantity of retransmission processes indicated by the piece of transmission control information, in a retransmission process entity corresponding to the transmit end device that sends the piece of transmission control information.

In at least one piece of transmission control information received by the receive end device, if a quantity of retransmission processes indicated by a piece of transmission control information is 1, the receive end device determines that the quantity of retransmission processes allocated to the receive end device by a transmit end device that sends the piece of transmission control information is 1, and the receive end device determines, in a retransmission process entity corresponding to the transmit end device that sends the piece of transmission control information, a retransmission process indicated by a retransmission process identifier included in the piece of transmission control information as a retransmission process that is allocated to the receive end device by the transmit end device that sends the transmission control information. If a quantity of retransmission processes indicated by a piece of transmission control information is 2, the receive end device determines that the quantity of retransmission processes allocated to the receive end device by a transmit end device that sends the piece of transmission control information is 2, the receive end device determines, in a retransmission process entity corresponding to the transmit end device that sends the piece of transmission control information, a retransmission process indicated by a retransmission process identifier included in the piece of transmission control information as a retransmission process that is allocated to the receive end device by the transmit end device that sends the transmission control information, calculates the other retransmission process identifier by using a preset algorithm based on the retransmission process identifier included in the piece of transmission control information, and determines, in the retransmission process entity corresponding to the transmit end device that sends the piece of transmission control information, a retransmission process indicated by the other retransmission process identifier as the other retransmission process that is allocated to the receive end device by the transmit end device that sends the piece of transmission control information, to determine two retransmission processes allocated to the receive end device by the transmit end device that sends the piece of transmission control information. In some embodiments, the retransmission process identifier may be a retransmission process number, and a retransmission process number included in the transmission control information has a specific retransmission process number range. The retransmission process number range may correspond to a retransmission process quantity, and the receive end device may add the retransmission process number included in the transmission control information and an integer multiple of the retransmission process quantity corresponding to the retransmission process number range, to obtain the other retransmission process number. For example, if the retransmission process number is 2, and the retransmission process quantity corresponding to the retransmission process number range is 8, the receive end device uses 2+8=10 as the other retransmission process number, or the receive end device uses 2+2*8=18 as the other retransmission process number.

For example, the implementation environment shown in FIG. 1 is used as an example. The plurality of transmit end devices include the transmit end device 001 and the transmit end device 002, the transmit end device 001 corresponds to a retransmission process entity 1, and the transmit end device 002 corresponds to a retransmission process entity 2. At least one piece of transmission control information received by the receive end device 003 includes: transmission control information 1 sent by the transmit end device 001 and transmission control information 2 sent by the transmit end device 002. It is assumed that both a quantity of retransmission processes indicated by a format of the transmission control information 1 and a quantity of retransmission processes indicated by a format of the transmission control information 2 are 1, a retransmission process identifier obtained by the receive end device 003 by parsing the transmission control information 1 is ID-A, and a retransmission process identifier obtained by the receive end device 003 by parsing the transmission control information 2 is ID-B. In this case, the receive end device 003 determines a retransmission process that is indicated by ID-A and that is in the retransmission process entity 1 as a retransmission process allocated by the transmit end device 001 to the receive end device 003, and determines a retransmission process that is indicated by ID-B and that is in the retransmission process entity 2 as a retransmission process allocated by the transmit end device 002 to the receive end device 003. It is assumed that both a quantity of retransmission processes indicated by a format of the transmission control information 1 and a quantity of retransmission processes indicated by a format of the transmission control information 2 are 1, a retransmission process identifier obtained by the receive end device 003 by parsing the transmission control information 1 is ID-A, and a retransmission process identifier obtained by the receive end device 003 by parsing the transmission control information 2 is ID-A. In this case, the receive end device 003 determines a retransmission process that is indicated by ID-A and that is in the retransmission process entity 1 as a retransmission process allocated by the transmit end device 001 to the receive end device 003, and determines a retransmission process that is indicated by ID-A and that is in the retransmission process entity 2 as a retransmission process allocated by the transmit end device 002 to the receive end device 003. It is assumed that a quantity of retransmission processes indicated by a format of the transmission control information 1 is 1 and a quantity of retransmission processes indicated by a format of the transmission control information 2 is 2, a retransmission process identifier obtained by the receive end device 003 by parsing the transmission control information 1 is ID-A, and a retransmission process identifier obtained by the receive end device 003 by parsing the transmission control information 2 is ID-A. In this case, the receive end device 003 determines a retransmission process that is indicated by ID-A and that is in the retransmission process entity 1 as a retransmission process allocated by the transmit end device 001 to the receive end device 003, and determines a retransmission process that is indicated by ID-A and that is in the retransmission process entity 2 as a retransmission process allocated by the transmit end device 002 to the receive end device 003. The receive end device 003 calculates, by using a preset algorithm, a retransmission process identifier of the other retransmission process allocated by the transmit end device 002 to the receive end device 003. Assuming that the other retransmission process identifier is ID-B, the receive end device 003 determines a retransmission process indicated by ID-B as the other retransmission process allocated by the transmit end device 002 to the receive end device 003.

Second aspect: A plurality of transmit end devices correspond to a same retransmission process entity, and the same retransmission process entity includes a plurality of retransmission processes. The same retransmission process entity is agreed upon in advance by the transmit end devices and the receive end device, or may be predefined in a standard. The receive end device may determine, in the same retransmission process entity based on a retransmission process identifier included in each piece of transmission control information and a quantity of retransmission processes indicated by the piece of transmission control information, a retransmission process that is allocated to the receive end device by the transmit end device that sends the piece of transmission control information. It should be noted that, if in transmission control information received by the receive end device, at least two pieces of transmission control information include a same retransmission process identifier, the receive end device may determine, in the same retransmission process entity based on a retransmission process identifier included in one of the at least two pieces of transmission control information, a retransmission process that is allocated to the receive end device by a transmit end device that sends the piece of transmission control information, calculate another retransmission process identifier by using a preset algorithm based on the retransmission process identifier included in the piece of transmission control information, and determine, in the same retransmission process entity based on the another retransmission process identifier, a retransmission process that is allocated to the receive end device by a transmit end device that sends another piece of transmission control information in the at least two pieces of transmission control information, thereby ensuring that retransmission processes allocated by different transmit end devices to the receive end device are not repeated, and ensuring accuracy of transmitted data that is restored through a retransmission control operation.

If the receive end device receives one piece of transmission control information, and a quantity of retransmission processes indicated by the piece of transmission control information is 1, the receive end device determines that a quantity of retransmission processes allocated to the receive end device by a transmit end device that sends the piece of transmission control information is 1, and the receive end device determines, in the same retransmission process entity, a retransmission process indicated by a retransmission process identifier included in the piece of transmission control information as a retransmission process that is allocated to the receive end device by the transmit end device that sends the piece of transmission control information. For example, the implementation environment shown in FIG. 1 is used as an example. The plurality of transmit end devices include the transmit end device 001 and the transmit end device 002, and the transmit end device 001 and the transmit end device 002 correspond to a retransmission process entity 1. At least one piece of transmission control information received by the receive end device 003 includes: transmission control information 1 sent by the transmit end device 001. It is assumed that a quantity of retransmission processes indicated by a format of the transmission control information 1 is 1, and a retransmission process identifier obtained by the receive end device 003 by parsing the transmission control information 1 is ID-A. In this case, the receive end device 003 determines a retransmission process that is indicated by ID-A and that is in the retransmission process entity 1 as a retransmission process allocated by the transmit end device 001 to the receive end device 003.

If the receive end device receives at least two pieces of transmission control information, a quantity of retransmission processes indicated by each of the at least two pieces of transmission control information is 1, and any two of the at least two pieces of transmission control information include different retransmission process identifiers, the receive end device determines that a quantity of retransmission processes allocated to the receive end device by a transmit end device that sends each piece of transmission control information is 1, and the receive end device determines, in the same retransmission process entity, a retransmission process indicated by a retransmission process identifier included in the piece of transmission control information as a retransmission process that is allocated to the receive end device by the transmit end device that sends the piece of transmission control information. For example, the implementation environment shown in FIG. 1 is used as an example. The plurality of transmit end devices include the transmit end device 001 and the transmit end device 002, and the transmit end device 001 and the transmit end device 002 correspond to a retransmission process entity 1. At least two pieces of transmission control information received by the receive end device 003 include: transmission control information 1 sent by the transmit end device 001 and transmission control information 2 sent by the transmit end device 002. It is assumed that both a quantity of retransmission processes indicated by a format of the transmission control information 1 and a quantity of retransmission processes indicated by a format of the transmission control information 2 are 1, a retransmission process identifier obtained by the receive end device 003 by parsing the transmission control information 1 is ID-A, and a retransmission process identifier obtained by the receive end device 003 by parsing the transmission control information 2 is ID-B. In this case, the receive end device 003 determines a retransmission process that is indicated by ID-A and that is in the retransmission process entity 1 as a retransmission process allocated by the transmit end device 001 to the receive end device 003, and determines a retransmission process that is indicated by ID-B and that is in the retransmission process entity 1 as a retransmission process allocated by the transmit end device 002 to the receive end device 003.

If the receive end device receives at least two pieces of transmission control information, a quantity of retransmission processes indicated by each of the at least two pieces of transmission control information is 1, and any two of the at least two pieces of transmission control information include same retransmission process identifiers, the receive end device determines that a quantity of retransmission processes allocated to the receive end device by a transmit end device that sends each piece of transmission control information is 1, and the receive end device determines, in the same retransmission process entity, a retransmission process indicated by a retransmission process identifier included in one piece of transmission control information as a retransmission process that is allocated to the receive end device by a transmit end device that sends the piece of transmission control information; calculates at least one other retransmission process identifier by using a preset algorithm based on the retransmission process identifier included in the piece of transmission control information; and determines a retransmission process indicated by each of the at least one other retransmission process identifier as a retransmission process allocated by at least one other transmit end device to the receive end device. In some embodiments, the retransmission process identifier may be a retransmission process number, and a retransmission process number included in the transmission control information has a specific retransmission process number range. The retransmission process number range may correspond to a retransmission process quantity, and the receive end device may add the retransmission process number included in the transmission control information and an integer multiple of the retransmission process quantity corresponding to the retransmission process number range, to obtain a retransmission process number of at least one other retransmission process. For example, if the retransmission process number is 2, and the retransmission process quantity corresponding to the retransmission process number range is 8, the receive end device uses 2+8=10 as a retransmission process number, uses 2+2*8=18 as another retransmission process number, and uses 2+3*8=26 as still another retransmission process number. For example, the implementation environment shown in FIG. 1 is used as an example. The plurality of transmit end devices include the transmit end device 001 and the transmit end device 002, and the transmit end device 001 and the transmit end device 002 correspond to a retransmission process entity 1. At least two pieces of transmission control information received by the receive end device 003 include: transmission control information 1 sent by the transmit end device 001 and transmission control information 2 sent by the transmit end device 002. It is assumed that both a quantity of retransmission processes indicated by a format of the transmission control information 1 and a quantity of retransmission processes indicated by a format of the transmission control information 2 are 1, a retransmission process identifier obtained by the receive end device 003 by parsing the transmission control information 1 is ID-A, and a retransmission process identifier obtained by the receive end device 003 by parsing the transmission control information 2 is ID-A. In this case, the receive end device 003 may determine a retransmission process that is indicated by ID-A and that is in the retransmission process entity 1 as a retransmission process allocated by the transmit end device 001 to the receive end device 003, and calculate, by using a preset algorithm based on ID-A, a retransmission process identifier of a retransmission process allocated by the transmit end device 002 to the receive end device 003. Assuming that the retransmission process identifier is ID-B, the receive end device 003 determines a retransmission process that is indicated by ID-B and that is in the retransmission process entity 1 as a retransmission process allocated by the transmit end device 002 to the receive end device 003. Alternatively, the receive end device 003 may determine a retransmission process that is indicated by ID-A and that is in the retransmission process entity 1 as a retransmission process allocated by the transmit end device 002 to the receive end device 003, and determine a retransmission process indicated by ID-B as a retransmission process allocated by the transmit end device 001 to the receive end device 003.

If the receive end device receives at least two pieces of transmission control information, a quantity of retransmission processes indicated by each of the at least two pieces of transmission control information is 2, and any two of the at least two pieces of transmission control information include same retransmission process identifiers, the receive end device determines that a quantity of retransmission processes allocated to the receive end device by a transmit end device that sends each piece of transmission control information is 2, and the receive end device determines, in the same retransmission process entity, a retransmission process indicated by a retransmission process identifier included in one piece of transmission control information as a retransmission process that is allocated to the receive end device by a transmit end device that sends the piece of transmission control information; calculates at least one other retransmission process identifier by using a preset algorithm based on the retransmission process identifier included in the piece of transmission control information; and determines a retransmission process indicated by each of the at least one other retransmission process identifier as a retransmission process allocated by at least one other transmit end device to the receive end device. In some embodiments, the retransmission process identifier may be a retransmission process number, and a retransmission process number included in the transmission control information has a specific retransmission process number range. The retransmission process number range may correspond to a retransmission process quantity, and the receive end device may add the retransmission process number included in the transmission control information and an integer multiple of the retransmission process quantity corresponding to the retransmission process number range, to obtain a retransmission process number of at least one other retransmission process. For example, if the retransmission process number is 2, and the retransmission process quantity corresponding to the retransmission process number range is 8, the receive end device uses 2+8=10 as a retransmission process number, uses 2+2*8=18 as another retransmission process number, and uses 2+3*8=26 as still another retransmission process number. For example, the implementation environment shown in FIG. 1 is used as an example. The plurality of transmit end devices include the transmit end device 001 and the transmit end device 002, and the transmit end device 001 and the transmit end device 002 correspond to a retransmission process entity 1. At least two pieces of transmission control information received by the receive end device 003 include: transmission control information 1 sent by the transmit end device 001 and transmission control information 2 sent by the transmit end device 002. It is assumed that both a quantity of retransmission processes indicated by a format of the transmission control information 1 and a quantity of retransmission processes indicated by a format of the transmission control information 2 are 2, a retransmission process identifier obtained by the receive end device 003 by parsing the transmission control information 1 is ID-A, and a retransmission process identifier obtained by the receive end device 003 by parsing the transmission control information 2 is ID-A. In this case, the receive end device 003 may determine a retransmission process that is indicated by ID-A and that is in the retransmission process entity 1 as a retransmission process allocated by the transmit end device 001 to the receive end device 003, and calculate three other retransmission process identifiers by using a preset algorithm based on ID-A. Assuming that the three other retransmission process identifiers are ID-B, ID-C, and ID-D, the receive end device 003 determines a retransmission process that is indicated by ID-B and that is in the retransmission process entity 1 as another retransmission process allocated by the transmit end device 001 to the receive end device 003, and determine a retransmission process indicated by ID-C and a retransmission process indicated by ID-D as retransmission processes allocated by the transmit end device 002 to the receive end device 003. Alternatively, the receive end device 003 may determine a retransmission process that is indicated by ID-A and that is in the retransmission process entity 1 as a retransmission process allocated by the transmit end device 001 to the receive end device 003, determine a retransmission process indicated by ID-C (or ID-D) as another retransmission process allocated by the transmit end device 001 to the receive end device 003, and determine a retransmission process indicated by ID-B and a retransmission process indicated by ID-D (or ID-C) as retransmission processes allocated by the transmit end device 002 to the receive end device 003. Alternatively, the transmit end device 003 may determine, in another manner, retransmission processes allocated by the transmit end device 001 and the transmit end device 002 to the receive end device 003. Details are not described herein in this embodiment of this application.

After determining a retransmission process that is allocated to the receive end device by a transmit end device that sends each piece of transmission control information, the receive end device may perform a retransmission control operation on data of the corresponding transmit end device by using the retransmission process. The retransmission process may be a HARQ process, and the retransmission control operation may be a HARQ operation. Herein, the retransmission control operation is described by using an example in which the retransmission process is a HARQ process and the retransmission control operation is a HARQ operation. Specifically, after receiving data sent by the transmit end device, the receive end device determines, based on a new data indicator (NDI) value of a HARQ process in received DCI, whether the received data is new data or retransmitted data. If the received data is new data, the receive end device performs cyclic redundancy check code (CRC) check on the received data, to determine whether to reply a negative acknowledgment (NACK) message or an acknowledgment (ACK) message to the transmit end device. If the CRC check performed by the receive end device on the received data succeeds, the receive end device replies an ACK message to the transmit end device, and clears a buffer (buffer) of a HARQ process in which the data is received. If the CRC check performed by the receive end device on the received data fails, the receive end device replies a NACK message to the transmit end device, and stores the received data in a buffer of a HARQ process corresponding to the transmit end device. If the received data is retransmitted data, the receive end device may combine (or may perform soft combination on) the received data and previously received data stored in a buffer of a HARQ process, and perform CRC check on combined data, to determine to reply an ACK message or a NACK message to the transmit end device. It should be noted that, in actual application, there may be a plurality of solutions in which the receive end device performs retransmission control on the data of the transmit end device. For example, the receive end device restores, by using a retransmission process, transmitted data based on initially transmitted data and retransmitted data that are sent by the transmit end device; the receive end device restores, by using a retransmission process, transmitted data based on initially transmitted data and retransmitted data that are sent by the transmit end device, and based on retransmitted data that may be retransmitted for one or more times; or the receive end device restores transmitted data based only on retransmitted data by using a retransmission process. For a specific implementation process in which the receive end device performs retransmission control on the data of the transmit end device, refer to the prior art. Details are not described in this embodiment of this application.

It should be noted that, although this embodiment of this application is described by using an example in which the receive end device is in the joint transmission mode of a plurality of pieces of transmission control information (in other words, a plurality of transmit end devices transmit data to the receive end device), in actual application, within one TTI (for example, one subframe), only one transmit end device may transmit data to the receive end device, and certainly, a plurality of transmit end devices may transmit data to the receive end device. This is not limited in this embodiment of this application. In addition, the data transmission method provided in at least this embodiment of this application may be performed in a particular condition. In other words, the data transmission method provided in at least this embodiment of this application is not performed in all environments. However, any method including a feature of the data transmission method provided in at least this embodiment of this application falls within the protection scope of this application. For example, when the receive end device is in the joint transmission mode of a single piece of transmission control information, the data transmission method provided in at least this embodiment of this application may not need to be performed.

It should be further noted that this embodiment of this application is described by using an example in which the receive end device is in the joint transmission mode of a plurality of pieces of transmission control information. When the receive end device is in the joint transmission mode of a single piece of transmission control information, the receive end device may receive one piece of transmission control information within one scheduling period. The piece of transmission control information is transmission control information sent by one transmit end device to the receive end device, and the piece of transmission control information is used to control data transmission from a plurality of transmit end devices to the receive end device. In some embodiments, a format of the piece of transmission control information may indicate a quantity of retransmission processes, and the piece of transmission control information includes a retransmission process identifier. When the quantity of retransmission processes indicated by the format of the piece of transmission control information is 1, the receive end device determines a retransmission process indicated by the retransmission process identifier included in the piece of transmission control information as a retransmission process allocated by the transmit end device to the receive end device. When the quantity of retransmission processes indicated by the format of the piece of transmission control information is 2, the receive end device determines a retransmission process indicated by the retransmission process identifier included in the piece of transmission control information as a retransmission process allocated by the transmit end device to the receive end device, calculates the other retransmission process identifier by using a preset algorithm based on the retransmission process identifier included in the piece of transmission control information, and determines a retransmission process indicated by the other retransmission process identifier as the other retransmission process allocated by the transmit end device to the receive end device. The two retransmission processes may be retransmission processes allocated by a same transmit end device to the receive end device, or may be retransmission processes allocated by different transmit end devices to the receive end device. The retransmission process may be a HARQ process, the retransmission process identifier may be a HARQ process number, and the transmission control information may be DCI in LTE. When the receive end device is in the joint transmission mode of a single piece of transmission control information, for a specific implementation process in which the receive end device determines a HARQ process allocated by the transmit end device to the receive end device and the receive end device performs a retransmission control operation, refer to the prior art, and details are not described herein again in this embodiment of this application.

In conclusion, according to the data transmission method provided in at least this embodiment of this application, the receive end device performs, based on the retransmission process identifier included in each piece of transmission control information, the retransmission control operation on the transmit end device that sends the piece of transmission control information, so that this helps resolve a problem that an error occurs when the receive end device restores transmitted data, and avoid an error in restoring the transmitted data by the receive end device.

In the following, with reference to the implementation environment shown in FIG. 1, the solution provided in at least this embodiment of this application is described by using an example in which the transmission control information is DCI in LTE, the retransmission process is a HARQ process, the retransmission process identifier is a HARQ process number, and a value range of a HARQ process number in a HARQ process number field in the DCI is {0, 1, . . . , N−1}. In addition, this description includes a case in which the receive end device 003 is in the joint transmission mode of a single piece of transmission control information, a case in which the receive end device 003 is in a non-CoMP (non-CoMP) mode, and a case in which the receive end device 003 is in the joint transmission mode of a plurality of pieces of transmission control information. When the receive end device 003 is in the non-CoMP mode and the receive end device 003 is in the joint transmission mode of a single piece of transmission control information, methods for determining a HARQ process by the receive end device 003 may be the same. Therefore, the two cases may be described together.

First case: The receive end device 003 is in the joint transmission mode of a single piece of transmission control information or the non-CoMP mode.

The receive end device 003 receives one piece of DCI, and the receive end device 003 determines, based on a format of the DCI, a quantity of HARQ processes indicated by the DCI. If the quantity of HARQ processes indicated by the DCI is 1, the HARQ process is a HARQ process allocated by a transmit end device (for example, the transmit end device 001) to the receive end device 003 (corresponding to the case in which the receive end device 003 is in the non-CoMP mode). If the quantity of HARQ processes indicated by the DCI is 2, the two HARQ processes may be HARQ processes allocated by two transmit end devices (for example, the transmit end device 001 and the transmit end device 002) to the receive end device 003 (corresponding to the case in which the receive end device 003 is in the joint transmission mode of a single piece of transmission control information). Alternatively, the two HARQ processes may be HARQ processes allocated by a transmit end device (for example, the transmit end device 001) to the receive end device 003 (corresponding to the case in which the receive end device 003 is in the non-CoMP mode).

When the quantity of HARQ processes indicated by the DCI is 1, the receive end device 003 determines, based on a HARQ process number in a HARQ process number field in the DCI, a HARQ process allocated by the transmit end device (for example, the transmit end device 001) to the receive end device 003. When the quantity of HARQ processes indicated by the DCI is 2, the receive end device 003 determines a HARQ process indicated by a HARQ process number 1 and a HARQ process indicated by a HARQ process number 2 as HARQ processes allocated by the transmit end device (for example, the transmit end device 001 and the transmit end device 002) to the receive end device.

HARQ process number 1=HARQ process number in the DCI; and

HARQ process number 2=HARQ process number in the DCI+N.

It should be noted that, in the first case, although HARQ processes indicated by the DCI may be HARQ processes allocated by different transmit end devices to the receive end device 003, because there are not different HARQ process number fields, the receive end device 003 may perform processing by using the processing method used for processing a HARQ process number field in LTE/LTE-A, and no collision occurs.

Second case: The receive end device 003 is in the joint transmission mode of a plurality of pieces of transmission control information.

(1) In a configuration of eight DMRS ports, it is assumed that the eight DMRS ports are a DMRS port 1 to a DMRS port 8, the DMRS port 1 to the DMRS port 4 form a group, and the DMRS port 5 to the DMRS port 8 form another group. The transmit end device 001 may allocate at least one DMRS port (for example, the DMRS port 1 and the DMRS port 3) in the DMRS port 1 to the DMRS port 4 to the transmit end device 001, and allocate at least one DMRS port (for example, the DMRS port 5 and the DMRS port 6) in the DMRS port 5 to the DMRS port 8 to the transmit end device 002. Then, the transmit end device 001 generates port group information, and sends the port group information to the receive end device 003. The port group information may be {1, 2, 3, 4} and {5, 6, 7, 8}. 1 to 8 in the port group information are all DMRS port numbers, 1 indicates the DMRS port 1, 2 indicates the DMRS port 2, and so on.

The receive end device 003 receives two pieces of DCI: DCI-001 and DCI-002, a quantity of HARQ processes indicated by each of formats of the two pieces of DCI is 2, and HARQ process numbers in HARQ process number fields in the two pieces of DCI are the same. Two HARQ processes indicated by each piece of DCI are HARQ processes allocated by a same transmit end device to the receive end device 003, DMRS port numbers included in the DCI-001 are 1 and 3, and DMRS port numbers included in the DCI-002 are 5 and 6. The receive end device 003 determines a HARQ process indicated by the HARQ process number 1 and a HARQ process indicated by the HARQ process number 2 as HARQ processes allocated by a transmit end device (for example, the transmit end device 001) to the receive end device 003, and determines a HARQ process indicated by the HARQ process number 3 and a HARQ process indicated by the HARQ process number 4 as HARQ processes allocated by another transmit end device (for example, the transmit end device 002) to the receive end device 003.

When the transmit end device 001 and the transmit end device 002 correspond to different HARQ entities,
HARQ process number 1=HARQ process number in the DCI-001;
HARQ process number 2=HARQ process number in the DCI-001+k*N (where k is an integer greater than 0);
HARQ process number 3=HARQ process number in the DCI-002; and
HARQ process number 4=HARQ process number in the DCI-002+m*N (where m is an integer greater than 0);
where both k and m are integers greater than 0, and k and m may be equal or not equal, for example, k=m=1, and in this case,
HARQ process number 1=HARQ process number in the DCI-001;
HARQ process number 2=HARQ process number in the DCI-001+N;
HARQ process number 3=HARQ process number in the DCI-002; and
HARQ process number 4=HARQ process number in the DCI-002+N.

When the transmit end device 001 and the transmit end device 002 correspond to a same HARQ entity,
HARQ process number 1=HARQ process number in the DCI-001;
HARQ process number 2=HARQ process number in the DCI-001+a*N;
HARQ process number 3=HARQ process number in the DCI-002+b*N;
HARQ process number 4=HARQ process number in the DCI-002+c*N,
where a, b, and c are integers greater than 0, and a, b, and c are not equal, for example, a=2, b=1, and c=3, and in this case,
HARQ process number 1=HARQ process number in the DCI-001;
HARQ process number 2=HARQ process number in the DCI-001+2N;
HARQ process number 3=HARQ process number in the DCI-002+N; and
HARQ process number 4=HARQ process number in the DCI-002+3N.

Transmission resources CCE 1 to CCE 20 of control channels are divided into two transmission resource sets, the CCE 1 to the CCE 10 belong to one transmission resource set, and the CCE 11 to the CCE 20 belong to the other transmission resource set. A transmit end device (for example, the transmit end device 001) allocates at least one CCE (for example, the CCE 2 to the CCE 5) in the CCE 1 to the CCE 10 to the transmit end device 001, and allocates at least one CCE (for example, the CCE 12 to the CCE 15) in the CCE 11 to the CCE 20 to the transmit end device 002. Then, the transmit end device generates resource set information, and sends the resource set information to the receive end device 003. The resource set information may be {CCE 1, CCE 2, CCE 3, CCE 4, CCE 5, CCE 6, CCE 7, CCE 8, CCE 9, CCE 10}, and {CCE 11, CCE 12, CCE 13, CCE 14, CCE 15, CCE 16, CCE 17, CCE 18, CCE 19, CCE 20}.

The receive end device 003 receives two pieces of DCI: DCI-001 and DCI-002, a quantity of HARQ processes indicated by each of formats of the two pieces of DCI is 2, and HARQ process numbers in HARQ process number fields in the two pieces of DCI are the same. Two HARQ processes indicated by each piece of DCI are HARQ processes allocated by a same transmit end device to the receive end device 003, transmission resources occupied by the DCI-001 are the CCE 2 and the CCE 3, and resource sets to which transmission resources occupied by the DCI-002 belong are the CCE 13 and the CCE 14. The receive end device 003 determines a HARQ process indicated by the HARQ process number 1 and a HARQ process indicated by the HARQ process number 2 as HARQ processes allocated by a transmit end device (for example, the transmit end device 001) to the receive end device 003, and determines a HARQ process indicated by the HARQ process number 3 and a HARQ process indicated by the HARQ process number 4 as HARQ processes allocated by another transmit end device (for example, the transmit end device 002) to the receive end device 003. For a method for calculating the HARQ process number 1, the HARQ process number 2, the HARQ process number 3, and the HARQ process number 4, refer to the foregoing description of the point (1). Details are not described herein again.

The following is apparatus embodiments of this application, and the apparatus embodiments may be used to perform the method embodiments of this application. For details not disclosed in the apparatus embodiments of this application, refer to the method embodiments of this application.

FIG. 6 is a block diagram of a receive end device 600 according to an embodiment of this application. The receive end device 600 is configured to perform data transmission with a plurality of transmit end devices, and transmission control information sent by each of the plurality of transmit end devices to the receive end device is used to control data transmission from the transmit end device to the receive end device. The receive end device may be the receive end device 003 in the implementation environment shown in FIG. 1. Referring to FIG. 6, the receive end device 600 may include but is not limited to:

a receiving module 610, configured to receive at least one piece of transmission control information, where the at least one piece of transmission control information includes transmission control information sent by at least one of the plurality of transmit end devices to the receive end device, and transmission control information sent by each of the at least one transmit end device to the receive end device includes a retransmission process identifier used in a retransmission control operation that is performed on the data transmission from the transmit end device to the receive end device;

a determining module 620, configured to: for each of the at least one piece of transmission control information, determine a transmit end device that sends the piece of transmission control information; and a control module 630, configured to perform, based on a retransmission process identifier included in the piece of transmission control information, a retransmission control operation on the transmit end device that sends the piece of transmission control information.

In some embodiments, the determining module 620 is configured to determine, based on a port group in which a DMRS port indicated by a demodulation reference signal DMRS port number included in the piece of transmission control information is located, the transmit end device that sends the piece of transmission control information.

In some embodiments, the determining module 620 is configured to determine, based on a transmission resource occupied by the piece of transmission control information, the transmit end device that sends the piece of transmission control information.

In conclusion, according to the receive end device provided in at least this embodiment of this application, the receive end device performs, based on the retransmission process identifier included in each piece of transmission control information, the retransmission control operation on the transmit end device that sends the piece of transmission control information, so that this helps resolve a problem that an error occurs when the receive end device restores transmitted data, and avoid an error in restoring the transmitted data by the receive end device.

Figure 7:
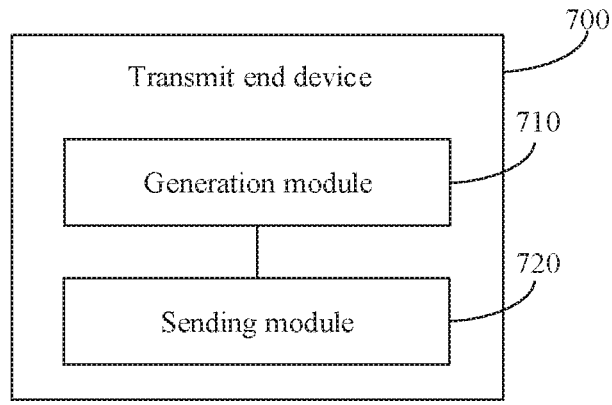
FIG. 7 is a block diagram of a transmit end device according to at least an embodiment of this application.

FIG. 7 is a block diagram of a transmit end device 700 according to an embodiment of this application. The transmit end device may be any transmit end device (for example, the transmit end device 001) in the implementation environment shown in FIG. 1. Referring to FIG. 7, the transmit end device 700 may include but is not limited to:

a generation module 710, configured to generate mode indication information, where the mode indication information is used to indicate a joint transmission mode; and a sending module 720, configured to send the mode indication information.

In some embodiments, the joint transmission mode is a joint transmission mode of a plurality of pieces of transmission control information or a joint transmission mode of a single piece of transmission control information.

In some embodiments, the joint transmission mode of a plurality of pieces of transmission control information is a mode in which a plurality of transmit end devices transmit data to a receive end device, and transmission control information sent by each of the plurality of transmit end devices to the receive end device is used to control data transmission from the transmit end device to the receive end device; and the joint transmission mode of a single piece of transmission control information is a mode in which a plurality of transmit end devices transmit data to a receive end device, and transmission control information sent by one of the plurality of transmit end devices to the receive end device is used to control data transmission from the plurality of transmit end devices to the receive end device.

In conclusion, according to the transmit end device provided in at least this embodiment of this application, the transmit end device can generate the mode indication information and send the mode indication information to the receive end device, so that the receive end device can determine a joint transmission mode of the receive end device based on the mode indication information, and perform a retransmission control operation on the transmit end device based on the joint transmission mode of the receive end device, thereby helping improve accuracy of performing the retransmission control operation by the receive end device.

Figure 8:
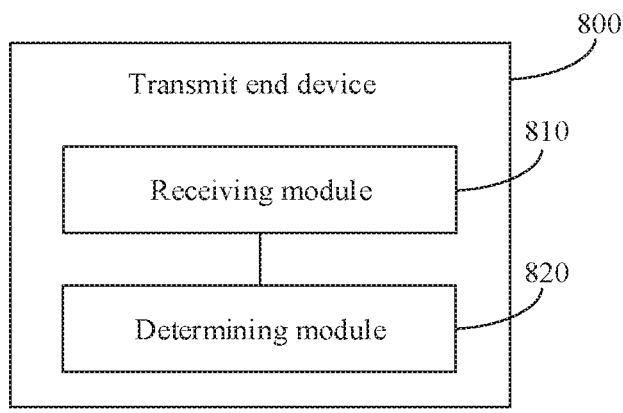
FIG. 8 is a block diagram of another receive end device according to at least an embodiment of this application.

FIG. 8 is a block diagram of a receive end device 800 according to an embodiment of this application. The receive end device may be the receive end device 003 in the implementation environment shown in FIG. 1. Referring to FIG. 8, the receive end device 800 may include but is not limited to:

a receiving module 810, configured to receive mode indication information, where the mode indication information is used to indicate a joint transmission mode; and a determining module 820, configured to determine the joint transmission mode based on the mode indication information.

In conclusion, according to the receive end device provided in at least this embodiment of this application, the receive end device can determine a joint transmission mode of the receive end device based on the mode indication information, and perform a retransmission control operation on the transmit end device based on the joint transmission mode of the receive end device, thereby helping improve accuracy of performing the retransmission control operation by the receive end device.

In some embodiments, the joint transmission mode is a joint transmission mode of a plurality of pieces of transmission control information or a joint transmission mode of a single piece of transmission control information.

In some embodiments, the joint transmission mode of a plurality of pieces of transmission control information is a mode in which a plurality of transmit end devices transmit data to a receive end device, and transmission control information sent by each of the plurality of transmit end devices to the receive end device is used to control data transmission from the transmit end device to the receive end device; and the joint transmission mode of a single piece of transmission control information is a mode in which a plurality of transmit end devices transmit data to a receive end device, and transmission control information sent by one of the plurality of transmit end devices to the receive end device is used to control data transmission from the plurality of transmit end devices to the receive end device.

In conclusion, according to the receive end device provided in at least this embodiment of this application, the receive end device can determine a joint transmission mode of the receive end device based on the mode indication information, and perform a retransmission control operation on the transmit end device based on the joint transmission mode of the receive end device, thereby helping improve accuracy of performing the retransmission control operation by the receive end device.

Figure 9:
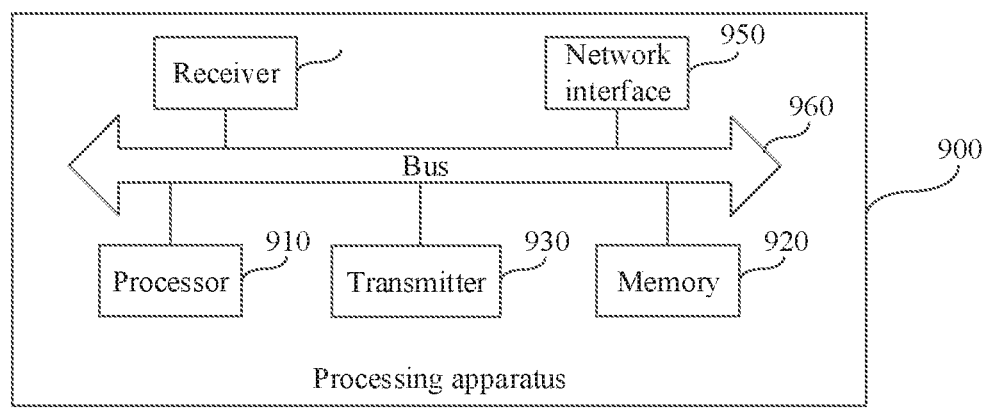
FIG. 9 is a schematic structural diagram of a processing apparatus according to at least an embodiment of this application.

FIG. 9 is a schematic structural diagram of a processing apparatus 900 according to an embodiment of this application. The processing apparatus 900 may be the receive end device 003 in the implementation environment shown in FIG. 1. Referring to FIG. 9, the processing apparatus 900 includes: a processor 910 and a memory 920. The processor 910 is configured to execute an instruction stored in the memory 920, and the processor 910 executes the instruction to implement the data transmission method in the embodiment shown in FIG. 5.

In some embodiments, as shown in FIG. 9, the processing apparatus 900 further includes: a transmitter 930, a receiver 940, and a network interface 950. The processor 910, the memory 920, the transmitter 930, the receiver 940, and the network interface 950 are connected by using a bus 960. The processor 910 includes one or more processing cores. The processor 910 performs various function applications and data processing by running a software program. There may be a plurality of network interfaces 950. The network interface 950 is used by the processing apparatus 900 to communicate with another storage device or a network device. The network interface 950 is optional. In actual application, the processing apparatus 900 may communicate with the another storage device or the network device by using the receiver 910 and the transmitter 960. Therefore, the processing apparatus 900 may not include the network interface. This is not limited in this embodiment of this application.

In at least this embodiment of this application, the processor 910 executes the instruction to implement a data transmission method, and the method includes:

receiving at least one piece of transmission control information, where the at least one piece of transmission control information includes transmission control information sent by at least one of a plurality of transmit end devices to the receive end device, and transmission control information sent by each of the at least one transmit end device to the receive end device includes a retransmission process identifier used in a retransmission control operation that is performed on data transmission from the transmit end device to the receive end device;

for each of the at least one piece of transmission control information, determining a transmit end device that sends the piece of transmission control information; and performing, based on a retransmission process identifier included in the piece of transmission control information, a retransmission control operation on the transmit end device that sends the piece of transmission control information.

In some embodiments, the determining a transmit end device that sends the piece of transmission control information includes: determining, based on a port group in which a DMRS port indicated by a demodulation reference signal DMRS port number included in the piece of transmission control information is located, the transmit end device that sends the piece of transmission control information.

In some embodiments, the determining a transmit end device that sends the piece of transmission control information includes: determining, based on a transmission resource occupied by the piece of transmission control information, the transmit end device that sends the piece of transmission control information.

In conclusion, according to the processing apparatus provided in at least this embodiment of this application, the receive end device performs, based on the retransmission process identifier included in each piece of transmission control information, the retransmission control operation on the transmit end device that sends the piece of transmission control information, so that this helps resolve a problem that an error occurs when the receive end device restores transmitted data, and avoid an error in restoring the transmitted data by the receive end device.

Figure 10:
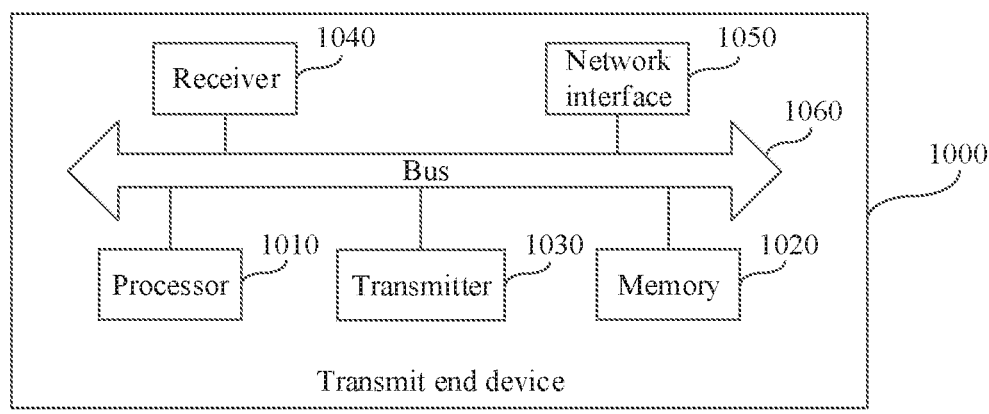
FIG. 10 is a schematic structural diagram of another processing apparatus according to at least an embodiment of this application.

FIG. 10 is a schematic structural diagram of a processing apparatus 1000 according to an embodiment of this application. The processing apparatus 1000 may be any transmit end device (for example, the transmit end device 003) in the implementation environment shown in FIG. 1. Referring to FIG. 10, the processing apparatus 1000 includes: a processor 1010 and a memory 1020. The processor 1010 is configured to execute the instruction stored in the memory 1020, and the processor 1010 executes the instruction to implement the mode indication method in the embodiment shown in FIG. 4.

In some embodiments, as shown in FIG. 10, the processing apparatus 1000 further includes: a transmitter 1030, a receiver 1040, and a network interface 1050. The processor 1010, the memory 1020, the transmitter 1030, the receiver 1040, and the network interface 1050 are connected by using a bus 1060. The processor 1010 includes one or more processing cores. The processor 1010 runs a software program, to perform various function applications and data processing. There may be a plurality of network interfaces 1050. The network interface 1050 is used by the processing apparatus 1000 to communicate with another storage device or a network device. The network interface 1050 is optional. In actual application, the processing apparatus 1000 may communicate with the another storage device or the network device by using the transmitter 1030 and the receiver 1040. Therefore, the processing apparatus 1000 may not include the network interface. This is not limited in this embodiment of this application.

In at least this embodiment of this application, the processor 1010 executes the instruction to implement a mode indication method, and the method includes:

generating mode indication information, where the mode indication information is used to indicate a joint transmission mode; and sending the mode indication information.

In some embodiments, the joint transmission mode is a joint transmission mode of a plurality of pieces of transmission control information or a joint transmission mode of a single piece of transmission control information.

In some embodiments, the joint transmission mode of a plurality of pieces of transmission control information is a mode in which a plurality of transmit end devices transmit data to a receive end device, and transmission control information sent by each of the plurality of transmit end devices to the receive end device is used to control data transmission from the transmit end device to the receive end device; and the joint transmission mode of a single piece of transmission control information is a mode in which a plurality of transmit end devices transmit data to a receive end device, and transmission control information sent by one of the plurality of transmit end devices to the receive end device is used to control data transmission from the plurality of transmit end devices to the receive end device.

In conclusion, according to the processing apparatus provided in at least this embodiment of this application, the transmit end device can generate the mode indication information and send the mode indication information to the receive end device, so that the receive end device can determine a joint transmission mode of the receive end device based on the mode indication information, and perform a retransmission control operation on the transmit end device based on the joint transmission mode of the receive end device, thereby helping improve accuracy of performing the retransmission control operation by the receive end device.

Figure 11:
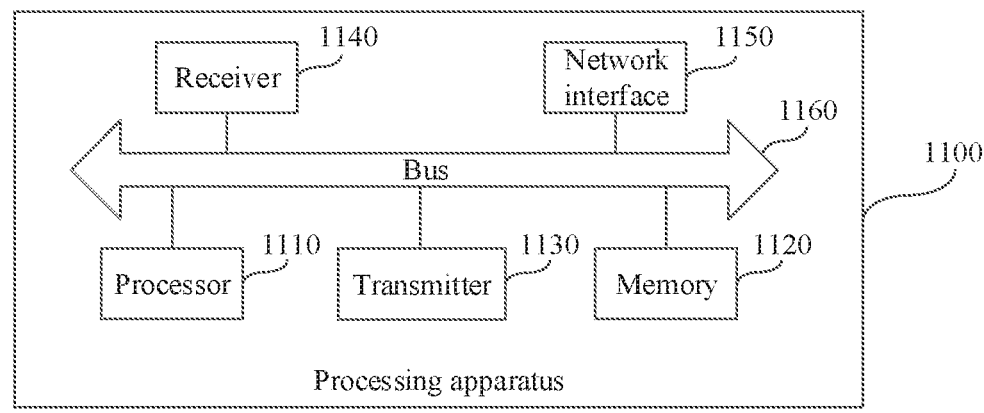
FIG. 11 is a schematic structural diagram of still another processing apparatus according to at least an embodiment of this application.

FIG. 11 is a schematic structural diagram of a processing apparatus 1100 according to an embodiment of this application. The processing apparatus 1100 may be the receive end device 003 in the implementation environment shown in FIG. 1. Referring to FIG. 11, the processing apparatus 1100 includes: a processor 1110 and a memory 1120. The processor 1110 is configured to execute an instruction stored in the memory 1120, and the processor 1110 executes the instruction to implement the mode determining method in the embodiment shown in FIG. 4.

In some embodiments, as shown in FIG. 11, the processing apparatus 1100 further includes: a transmitter 1130, a receiver 1140, and a network interface 1150. The processor 1110, the memory 1120, the transmitter 1130, the receiver 1140, and the network interface 1150 are connected by using a bus 1160. The processor 1110 includes one or more processing cores. The processor 1110 performs various function applications and data processing by running a software program. There may be a plurality of network interfaces 1150. The network interface 1150 is used by the processing apparatus 1100 to communicate with another storage device or a network device. The network interface 1150 is optional. In actual application, the processing apparatus 1100 may communicate with the another storage device or the network device by using the receiver 1110 and the transmitter 1160. Therefore, the processing apparatus 1100 may not include the network interface. This is not limited in this embodiment of this application.

In at least this embodiment of this application, the processor 1110 executes the instruction to implement a mode determining method, and the method includes:

receiving mode indication information, where the mode indication information is used to indicate a joint transmission mode; and determining the joint transmission mode based on the mode indication information.

In some embodiments, the joint transmission mode is a joint transmission mode of a plurality of pieces of transmission control information or a joint transmission mode of a single piece of transmission control information.

In some embodiments, the joint transmission mode of a plurality of pieces of transmission control information is a mode in which a plurality of transmit end devices transmit data to a receive end device, and transmission control information sent by each of the plurality of transmit end devices to the receive end device is used to control data transmission from the transmit end device to the receive end device; and the joint transmission mode of a single piece of transmission control information is a mode in which a plurality of transmit end devices transmit data to a receive end device, and transmission control information sent by one of the plurality of transmit end devices to the receive end device is used to control data transmission from the plurality of transmit end devices to the receive end device.

In conclusion, according to the processing apparatus provided in at least this embodiment of this application, the receive end device can determine a joint transmission mode of the receive end device based on the mode indication information, and perform a retransmission control operation on the transmit end device based on the joint transmission mode of the receive end device, thereby helping improve accuracy of performing the retransmission control operation by the receive end device.

An embodiment of this application further provides a processing apparatus. The processing apparatus includes at least one circuit, and the at least one circuit is configured to perform the data transmission method shown in FIG. 5.

An embodiment of this application further provides a processing apparatus. The processing apparatus includes at least one circuit, and the at least one circuit is configured to perform the mode indication method in the embodiment shown in FIG. 4.

An embodiment of this application further provides a processing apparatus. The processing apparatus includes at least one circuit, and the at least one circuit is configured to perform the mode determining method in the embodiment shown in FIG. 4.

An embodiment of this application further provides a computer-readable storage medium. The computer-readable storage medium stores an instruction, and when the instruction is run on a processing component of a computer, the processing component is enabled to perform the data transmission method shown in FIG. 5.

An embodiment of this application further provides a computer-readable storage medium. The computer-readable storage medium stores an instruction, and when the instruction is run on a processing component of a computer, the processing component is enabled to perform the mode indication method in the embodiment shown in FIG. 4.

An embodiment of this application further provides a computer-readable storage medium. The computer-readable storage medium stores an instruction, and when the instruction is run on a processing component of a computer, the processing component is enabled to perform the mode determining method in the embodiment shown in FIG. 4.

An embodiment of this application further provides a computer program product including an instruction. When the computer program product is run on a processing component of a computer, the processing component is enabled to perform the data transmission method shown in FIG. 5.

An embodiment of this application further provides a computer program product including an instruction. When the computer program product is run on a processing component of a computer, the processing component is enabled to perform the mode indication method in the embodiment shown in FIG. 4.

An embodiment of this application further provides a computer program product including an instruction. When the computer program product is run on a processing component of a computer, the processing component is enabled to perform the mode determining method in the embodiment shown in FIG. 4.

An embodiment of this application further provides a processing apparatus. The apparatus is configured to implement some of or all of the methods provided in the foregoing embodiments.

All or some of the foregoing embodiments may be implemented by using software, hardware, firmware, or any combination thereof. When software is used for implementation, the embodiments may be implemented completely or partially in a form of a computer program product. The computer program product includes one or more computer instructions. When the computer program instructions are loaded and executed on a computer, the procedure or functions in the embodiments of this application are completely or partially generated. The computer may be a general-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer storage medium may be any usable medium accessible by a computer, or a data storage device, such as a server or a data center, integrating one or more usable media. The usable medium may be a magnetic medium (for example, a soft disk, a hard disk, or a magnetic tape), an optical medium, a semiconductor medium (for example, a solid-state drive, or the like.

The sequence numbers of the foregoing embodiments of this application are merely for illustrative purposes, and are not intended to indicate priorities of the embodiments.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely optional embodiments of this application, but are not intended to limit this application. Any modification, equivalent replacement, or improvement made without departing from the spirit and principle of this application should fall within the protection scope of this application.

What is claimed is:

1. A data transmission method between a plurality of transmit end devices and a receive end device, the method comprising:
   receiving, by the receive end device, at least one piece of transmission control information, wherein the at least one piece of transmission control information comprises transmission control information received by the receive end device from at least one of the plurality of transmit end devices, and transmission control information from each of the plurality of transmit end devices comprises a retransmission process identifier, the transmission control information controls data transmission between the transmit end device and the receive end device;
   for each of the at least one piece of transmission control information, determining the corresponding transmit end device of the plurality of transmit end devices configured to send the corresponding piece of transmission control information, wherein the determining the corresponding transmit end device of the plurality of transmit end devices configured to send the corresponding piece of transmission control information comprises:
      determining, based on a port group, the port group including a demodulation reference signal (DMRS) port indicated by a DMRS port number in the piece of transmission control information, the corresponding transmit end device configured to send the corresponding piece of transmission control information; or
      determining, based on a transmission resource occupied by the corresponding piece of transmission control information, the corresponding transmit end device configured to send the corresponding piece of transmission control information; and
   performing a retransmission control operation on the data transmission received by the receive end device from the transmit end device of the plurality of transmit end devices, the retransmission control operation includes the retransmission process identifier included in the piece of transmission control information.

2. A receive end device, wherein the receive end device is configured to perform data transmission with a plurality of transmit end devices, and the receive end device comprises:
   a processor;
   a memory, configured to store at least one computer instruction, which when executed, causes the processor to perform:
      receiving at least one piece of transmission control information, wherein the at least one piece of transmission control information comprises transmission control information received by the receive end device from at least one of the plurality of transmit end devices, and transmission control information from each of the plurality of transmit end devices comprises a retransmission process identifier, the transmission control information controls data transmission between the transmit end device and the receive end device;
      for each of the at least one piece of transmission control information, determining the corresponding transmit end device of the plurality of transmit end devices configured to send the corresponding piece of transmission control information, the determining the corresponding transmit end device of the plurality of transmit end devices configured to send the corresponding piece of transmission control information comprises:
         determining, based on a port group, the port group including a demodulation reference signal (DMRS) port indicated by a DMRS port number in the piece of transmission control information, the corresponding transmit end device configured to send the corresponding piece of transmission control information; or
         determining, based on a transmission resource occupied by the corresponding piece of transmission control information, the corresponding transmit end device configured to send the corresponding piece of transmission control information; and
      performing a retransmission control operation on the data transmission received by the receive end device from the transmit end device of the plurality of transmit end devices, the retransmission control operation includes the retransmission process identifier included in the piece of transmission control information.

3. A non-transitory computer-readable storage medium, wherein the computer-readable storage medium stores instructions, and when the instructions are executed by a processor of a receive end device, cause the processor to perform a data transmission method with a plurality of transmit end devices the data transmission method comprising:
   receiving at least one piece of transmission control information, wherein the at least one piece of transmission control information comprises transmission control information received by the receive end device from at least one of the plurality of transmit end devices, and transmission control information from each of the plurality of transmit end devices comprises a retransmission process identifier, the transmission control information controls data transmission between the transmit end device and the receive end device;
   for each of the at least one piece of transmission control information, determining the corresponding transmit end device of the plurality of transmit end devices configured to send the corresponding piece of transmission control information, the determining the corresponding transmit end device of the plurality of transmit end devices configured to send the corresponding piece of transmission control information comprises:
      determining, based on a port group, the port group including a demodulation reference signal (DMRS) port indicated by a DMRS port number in the piece of transmission control information, the corresponding transmit end device configured to send the corresponding piece of transmission control information; or
      determining, based on a transmission resource occupied by the corresponding piece of transmission control information, the corresponding transmit end device configured to send the corresponding piece of transmission control information; and
   performing a retransmission control operation on the data transmission received by the receive end device from the transmit end device of the plurality of transmit end devices, the retransmission control operation includes the retransmission process identifier included in the piece of transmission control information.

\* \* \* \* \*